United States Patent
Wu et al.

(10) Patent No.: US 12,320,920 B2
(45) Date of Patent: Jun. 3, 2025

(54) AUTOMOTIVE RADAR WITH RANGE MIGRATION MITIGATION CAPABILITY

(71) Applicant: NXP B.V., Eindhoven (NL)

(72) Inventors: Ryan Haoyun Wu, San Jose, CA (US); Dongyin Ren, East Brunswick, NJ (US); Satish Ravindran, Santa Clara, CA (US)

(73) Assignee: NXP B. V., Eindhoven (NL)

( * ) Notice: Subject to any disclaimer, the term of this patent is extended or adjusted under 35 U.S.C. 154(b) by 499 days.

(21) Appl. No.: 17/715,520

(22) Filed: Apr. 7, 2022

(65) Prior Publication Data
US 2023/0324509 A1 Oct. 12, 2023

(51) Int. Cl.
G01S 13/931 (2020.01)
G01S 7/35 (2006.01)
G01S 13/58 (2006.01)

(52) U.S. Cl.
CPC ............ *G01S 7/354* (2013.01); *G01S 7/356* (2021.05); *G01S 13/584* (2013.01); *G01S 13/931* (2013.01)

(58) Field of Classification Search
CPC ........ G01S 7/354; G01S 7/356; G01S 13/584; G01S 13/931; G01S 13/345
See application file for complete search history.

(56) References Cited

U.S. PATENT DOCUMENTS

| | | | |
|---|---|---|---|
| 6,222,933 B1 * | 4/2001 | Mittermayer ......... | G01S 13/904 382/293 |
| 10,451,712 B1 * | 10/2019 | Madhow ............... | G01S 13/723 |
| 2017/0363711 A1 * | 12/2017 | Rao ......................... | G01S 7/023 |
| 2021/0173042 A1 * | 6/2021 | Wu ......................... | G01S 7/356 |

FOREIGN PATENT DOCUMENTS

| | | | | |
|---|---|---|---|---|
| CN | 104062640 B | | 3/2016 | |
| CN | 106950550 A | * | 7/2017 | ........... G01S 13/584 |
| EP | 3444631 A1 | * | 2/2019 | ............. G01S 13/34 |
| EP | 3835810 A1 | | 6/2021 | |

OTHER PUBLICATIONS

D. Zhu, Y. Li and Z. Zhu, "A Keystone Transform Without Interpolation for SAR Ground Moving-Target Imaging," in IEEE Geoscience and Remote Sensing Letters, vol. 4, No. 1, pp. 18-22, Jan. 2007, (Year: 2007).*

(Continued)

*Primary Examiner* — Vladimir Magloire
*Assistant Examiner* — Bongani Jabulani Mashele

(57) ABSTRACT

A linear chirp radar system, apparatus and method use a radar control processing unit to control an LFM radar front end which generates analog-to-digital (ADC) sample signals from one or more target return signals received in response to transmitted linear chirp radar signals, where the radar control processing unit is connected and configured to mitigate range migration by directly filtering the ADC samples using a modified Doppler filter that is tuned to fast-time scaled, slow-time frequencies to generate a focused ADC Doppler cube, and by applying a Fourier Transform on each Doppler cell in the focused ADC Doppler cube to generate a focused range-Doppler cube.

20 Claims, 15 Drawing Sheets

(56) References Cited

OTHER PUBLICATIONS

L. Xu, J. Lien and J. Li, "Doppler-Range Processing for Enhanced High-Speed Moving Target Detection Using LFMCW Automotive Radar," in IEEE Transactions on Aerospace and Electronic Systems, vol. 58, No. 1, pp. 568-580, Feb. 2022, (Year: 2022).*
O. Ulha and Y. Tanik, "Low Complexity Keystone Transform and Radon Fourier Transform Utilizing Chirp-Z Transform," in IEEE Access, vol. 8, pp. 105535-105541, 2020, (Year: 2020).*
Xu (Doppler-Range Processing for Enhanced High-Speed Moving Target Detection Using LFMCW Automotive Radar) (Year: 2021).*
Shijian Shen et al., An Improved Coherent Integration Method for Wideband Radar Based on Two-Dimensional Frequency Correction, MDPI Electronics, received Apr. 9, 2020; accepted May 15, 2020; published May 19, 2020.
Yongbo Zhao et al., Low Complexity Keystone Transform without Interpolation for Dim Moving Target Detection, Proceedings of 2011 IEEE CIE International Conference on Radar, Oct. 24-27, 2011.
Ryan Haoyun Wu et al., Radar Communications with Oversampling, U.S. Appl. No. 17/329,470, filed May 25, 2021.
Luzhou Xu et L "Doppler-Range Processing for Enhanced High-Speed Moving Target Dete". ction Using LFMCW Automotive Radar IEEE Transactions on Aerospace and Electronic systems. vol. 58, No. Feb. 1, 2022.

* cited by examiner

2A

2B

3 ⤸

6A

6B

AUTOMOTIVE RADAR WITH RANGE MIGRATION MITIGATION CAPABILITY

BACKGROUND OF THE INVENTION

Field of the Invention

The present invention is directed in general to radar systems and associated methods of operation. In one aspect, the present invention relates to an automotive radar system which uses transmit and receive antennas and associated methods of operation.

Description of the Related Art

To improve the safety of vehicle and passengers, Advanced Driver Assistance Systems (ADAS) systems use radar-based detection to provide reliable and accurate details of a vehicle's surroundings and to assist drivers to sense the on-road potential hazards in case of blocked vision or poor visibility conditions. ADAS radars operate by transmitting or radiating signals from transmitting antennas on a vehicle so that, when the transmitted radar signal hits a target and is reflected back to the vehicle, the target return signal is received by a radar front-end (FE) unit and processed by a radar controller processing unit to identify the target's range, velocity and angular position. Next generation digital radars provide high-range resolution by using coherent integration and Doppler processing techniques to increase the target's signal-to-noise ratio. With such techniques, the radars collect a coherent processing interval (CPI) of fast-time/slow-time data from the target return signals and perform a slow-time discrete Fourier transform (DFT) on all range bins to generate a range-Doppler matrix. However, the relationship between the target velocity, CPI duration, and range bin spacing is such that the target's range change within the CPI is less than one range bin so that the target stays in the same range bind bin over the duration of the CPI. However, with automotive radar applications that have small range cells to provide high-range resolution, the high relative speed between a target and the operating radar can result in corresponding target's range peak response straddling across more than one range cells in the life of the entire chirp sequence, undermining the subsequent Doppler coherent integration and angle estimation processes. This is known as the range migration issue. The issue is worsened when the size of range resolution cell is further decreased in high range resolution systems.

While there are radar processing techniques have been proposed to correct range migration and improve the speed of signal processing, such techniques are computationally expensive and complex. For example, Keystone Transform (KST) is a known method applied to pulsed Doppler radar signals to transform the migrating ranges into constant ranges so the degradation to the Doppler processing is mitigated. The KST process starts with analyzing the spectrum of the computed matched-filtered range response, and then interpolates individual spectral components of the range response in the slow time domain onto modified slow-time sampling grids, and then converts or inverse-transforms the spectral results back to the range response domain. As a result, existing radar systems are extremely difficult at a practical level by virtue of the balancing performance, complexity, and cost requirements of providing high resolution detection of range, velocity and angular position in high-speed target detection environments in a compact and cost-effective way.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A Linear Frequency Modulation (LFM) automotive radar system, apparatus, and methodology are described for mitigating range migration by directly filtering ADC samples using a modified Doppler filter that is tuned to fast-time scaled, slow-time frequencies. In selected embodiments, an efficient range migration mitigation processing is proposed which operates directly on the ADC samples with a frequency-scaled discrete Fourier transform (DFT) Doppler filter. Instead of the processing the range response spectrum, the disclosed range migration process starts with performing a modified DFT on each ADC sample position across the slow-time to obtain a focused Doppler spectrum, where each DFT is tuned to a set of radial velocities which are scaled as a function of the ADC sampling time when computing the DFT. Subsequently, a Fourier Transform is performed on each Doppler cell across the fast time to obtain the focused range. This may be implemented by performing a modified Doppler filtering for each ADC sample position in each raw data cube down the slow-time dimension, where each of the modified Doppler filters is tuned to a slow-time frequency as a function of (1) a desired radial velocity to be evaluated and (2) a scaling factor which is a function of the current fast-time ADC sample's sampling time relative to the chirp acquisition start time. Outputs of the modified Doppler filter form the range migration-free Doppler spectrum for the fast time position. In addition, the modified DFT process can be streamlined by arranging the modified DFT into a discrete convolution form that may be implemented in the frequency domain using the convolution theorem. To this end, the modified DFT process may be expedited by using a hardware-accelerated Fast Fourier Transform (FFT) and Inverse Fast Fourier Transform (IFFT) engine, thereby achieving improved computational efficiency and speed.

Figure 1:
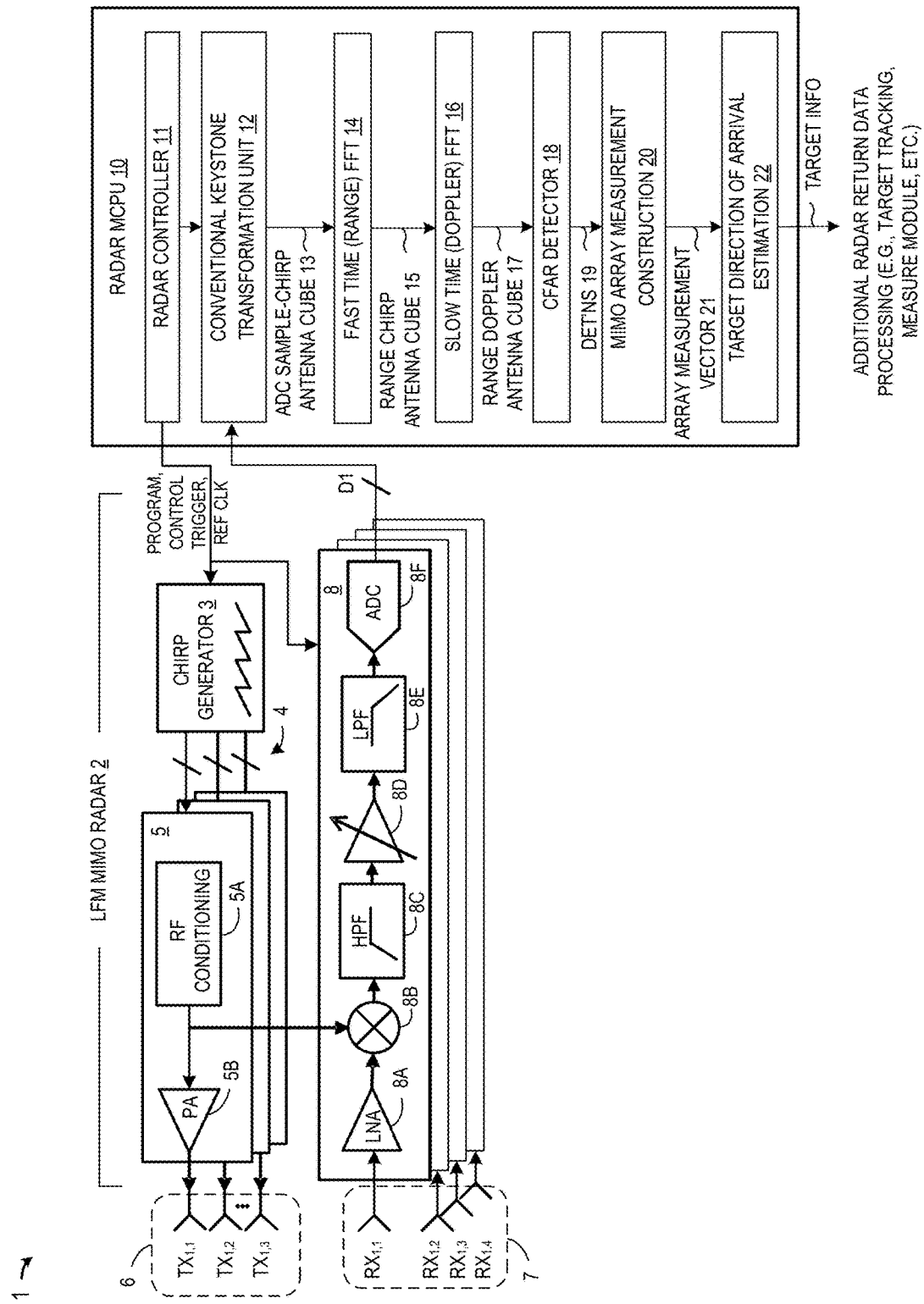
FIG. 1 is a simplified schematic block diagram of a Linear Frequency Modulation (LFM) MIMO automotive radar system which uses conventional Keystone Transformation to mitigate range migration.

By way of background to the present disclosure, reference is now made to FIG. 1 which depicts a simplified schematic block diagram of an LFM MIMO automotive radar system 1 which uses conventional Keystone Transformation to mitigate range migration. As depicted, the radar system 1 includes one or more distributed an LFM multiple-input, multiple output (MIMO) automotive radar front-end devices 2 connected between a radar microcontroller processing unit (MCPU) 10 and a transmit antenna array 6. In selected embodiments, the LFM MIMO radar device 2 may be embodied as a line-replaceable unit (LRU) or modular component that is designed to be replaced quickly at an operating location. Similarly, the radar MCPU 10 may be embodied as a line-replaceable unit (LRU) or modular component. Although a single or mono-static LFM MIMO radar device 2 is shown, it will be appreciated that additional distributed radar devices may be used to form a distributed or multi-static radar. In addition, the depicted radar system 1 may be implemented in integrated circuit form with the LFM MIMO radar device 2 and the radar MCPU 10 formed with separate integrated circuits (chips) or with a single chip, depending on the application.

Each distributed LFM MIMO radar front-end device 2 includes one or more transmitting antenna elements $TX_i$ and receiving antenna elements $RX_j$ connected, respectively, to one or more radio-frequency (RF) transmitter (TX) units 5 and receiver (RX) units 8. For example, each radar device 2 is shown as including individual antenna elements (e.g., $TX_{1,i}$, $RX_{1,j}$) connected, respectively, to three transmitter modules (e.g., 5) and four receiver modules (e.g., 8), but these numbers are not limiting and other numbers are also possible, such as four transmitter modules 5 and six receiver modules 8, or a single transmitter module 5 and/or a single receiver module 8. Each radar device 2 also includes a chirp generator 3 which is configured and connected to supply a chirp input signal to the transmitter module(s) 5. To this end, the chirp generator 3 is connected to receive a program, control trigger, and independent local oscillator (LO) reference clock signal from the radar MCPU 10. Chirp signals are generated and transmitted to multiple transmitters 5, usually following a pre-defined transmission schedule, where they are filtered at the RF conditioning module 5A and amplified at the power amplifier 5B before being fed to the corresponding transmit antenna $TX_{1,i}$ and radiated. For example, by sequentially using each transmit antenna $TX_{1,i}$ to transmit successive pulses in the chirp signal, each transmitter element 5 operates in a time-multiplexed fashion in relation to other transmitter elements because they are programmed to transmit identical waveforms on a temporally separated schedule.

The radar system 1 also includes a radar MCPU 10 that is connected to supply input program, control trigger, and independent local oscillator (LO) reference clock signals to the radar device 2 and to receive therefrom digital output signals D1 generated by the receiver modules 8. In selected embodiments, the radar MCPU 10 may be configured and arranged for signal processing tasks such as, but not limited to, target identification, computation of target distance, target velocity, and target direction, and generating control signals. The radar MCPU 10 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, for example, the radar MCPU 10 may be configured to program the transmitter modules 5 to operate in a time-division fashion by sequentially transmitting LFM chirps for coordinated communication between the transmit antennas $TX_{1,i}$, $RX_{1,j}$.

In the example shown, each chirp generator 3 generates a chirp signal 4 in response to a chirp start trigger signal and a corresponding reference local oscillator signal (Reference LO). The resulting chirp signal 4 from each chirp generator 3 is then processed by the RF conditioning unit 5A and amplified at the power amplifier (PA) 5B which amplifies the signal to a level suitable for transmission as a radar signal by a transmitter antenna unit $TX_{1,1}$ 6. Though not shown, it will be understood that the transmitter module 5 may include additional processing circuits, such as a digital-to-analog converter (DAC), phase shifter (or phase rotator), buffer, mixer, filter, and the like.

The radar signal transmitted by the transmitter antenna unit $TX_{1,1}$ 6 may be reflected by an object, and part of the reflected radar signal reaches the receiver antenna units $RX_{1,i}$ 7 at the radar device 2. At each receiver module 8, the received (radio frequency) antenna signal is amplified by a low noise amplifier (LNA) 8A and then fed to a mixer 8B where it is mixed with the transmitted chirp signal generated by the RF conditioning unit 5A. The resulting intermediate frequency signal is fed to a first high-pass filter (HPF) 8C. The resulting filtered signal is fed to a first variable gain amplifier 8D which amplifies the signal before feeding it to a first low pass filter (LPF) 8E. This re-filtered signal is fed to an analog/digital converter (ADC) 8F and is output by each receiver module 8 as a digital signal D1.

At the radar MCPU 10, the digital signal D1 is processed by the radar modules 12-22 to detect and measure target returns by extracting target range, Doppler (radial velocity), angle, and amplitude information. For example, the digital output signals D1 may be processed by a conventional Keystone Transformation (KST) unit 12 which generates an ADC sample-chirp antenna cube 13 by applying KST processing to pulsed Doppler radar signals wherein range migration is mitigated by transforming the migrating ranges into constant ranges so the degradation to the Doppler processing is mitigated. The KST unit 12 applies a computationally expensive process which starts with analyzing the spectrum of the computed matched-filtered range response, and then interpolates individual spectral components of the range response in the slow time domain onto modified slow-time sampling grids before inverse-transforming back to the range response domain. The resulting ADC sample-chirp antenna cube 13 is then processed by one or more fast Fourier transform (FFT) modules, such as a fast-time (range) FFT module 14 and slow-time (Doppler) FFT module 16, thereby generating, respectively, a three-dimensional range-chirp antenna cube 15 and range-Doppler antenna cube 17. In turn, the Fourier-transformed outputs 17 are then passed through one or more constant false alarm rate (CFAR) detector modules 18 to obtain the range-Doppler peak detections 19 which are processed by the MIMO array measurement construction module 20 to construct array measurement vectors 21 for use by the target direction of arrival estimation module 22 to estimate the direction of arrival for the target return(s). In addition, there are one or more additional radar return data processing steps that may be performed, such as target tracking processing and measurement processing, with the result being output to other automotive computing or user interfacing devices for further process or display.

Figure 2A:
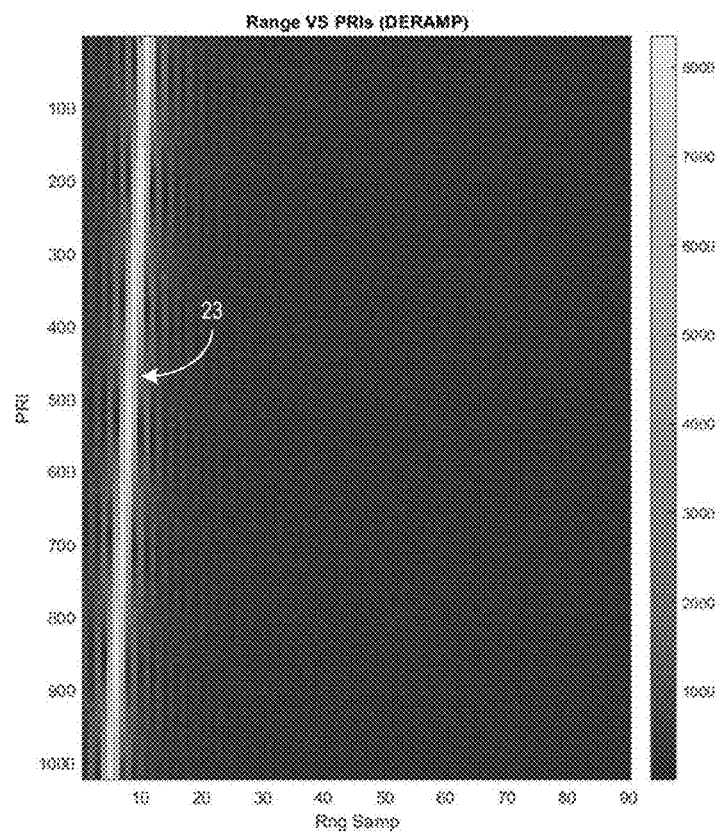
FIG. 2A shows a simulated range migration effect of a single moving target with simulated range responses of multiple chirps or pulse repetition intervals in a coherent processing interval.
Figure 2B:
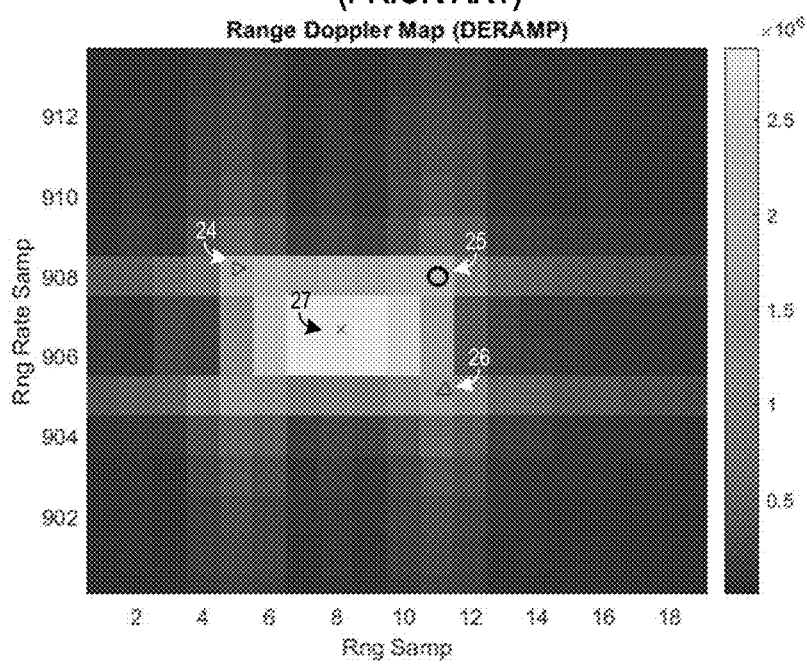
FIG. 2B shows a simulated range-Doppler map response to the migration effect without range migration mitigation.

To provide additional details for an improved contextual understanding of the present disclosure, reference is now made to FIG. 2A which is a simulation 2A of multiple chirps or pulse repetition intervals (PRI) in a CPI (along the vertical axis) versus the range samples (along the horizontal axis) to show the migration effect of a single moving target with simulated range responses of multiple chirps or pulse repetition intervals in a coherent processing interval. As depicted with the slanted lighter-colored line 23, the movement of the target can be traced according to the peak of the range response (each row) as the target moves across multiple range cells (along the horizontal axis). Since the target does not stay within the same range cell throughout the coherent processing interval, the Doppler FFT fails to correctly integrate the signals. This result is depicted in FIG. 2B which shows a simulated range-Doppler map response 2B to the migration effect without range migration mitigation. In the simulated example, the initial target range (at the time of the transmitting the first chirp) and range rate values are located at cell 25 (corresponding to the $11^{th}$ range bin and the $908^{th}$ range rate bin), but due to range migration effects that are not corrected, the depicted simulation 2B includes a smeared peak response which spreads over multiple range bins (e.g., 6-10), thereby incorrectly identifying the lightly colored cell 27 as the peak power cell with a reduced power (e.g., 129.2 dB) that is centered within the cells 24-26, which indicate the boundary corners of the smeared and offset range Doppler peak, thereby generating incorrect range and range rate values for the target. Without the range migration effects, the smearing effect is eliminated, and the range-Doppler map response would instead show a sharp peak (for example, at cell 25). However, without range migration mitigation, the smearing effect is worsened as the amount of migration increases with increasing target speed.

Figure 3:
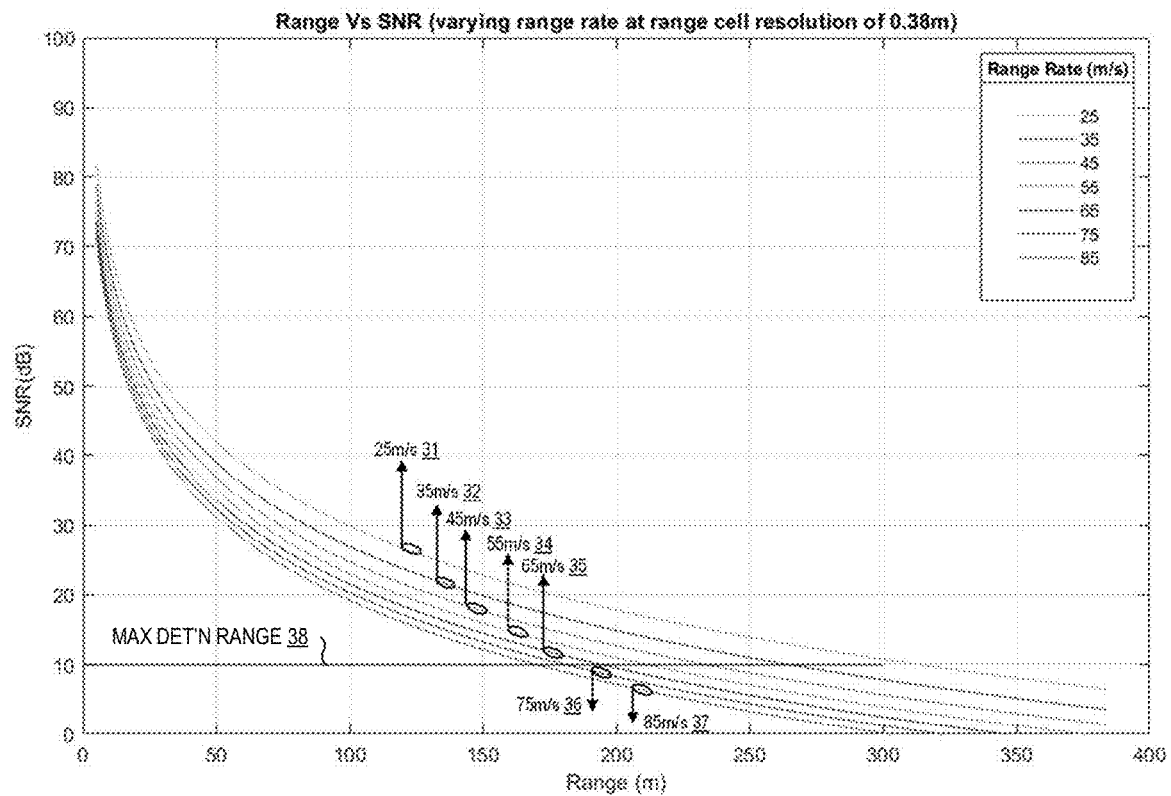
FIG. 3 shows a simulated plot of the range migration SNR degradation as a function of target speed.

For an improved understanding of selected embodiments of the present disclosure, reference is now made to FIG. 3 which shows a simulated plot 3 of the signal-to-noise ratio (SNR) as a function of the range to illustrate the degradation of the SNR as a function of target speed. In particular, the illustrated target speed SNR-range curves 31-37 are plotted against the 10-dB SNR detection threshold line 38 so that the point of crossing indicates the maximum detection range of the radar. The detrimental effects of range migration are seen from the fact that the detection range of the system decreases as the target speed increases. For example, the detection range is over 300 m for a target having a velocity of 25 m/s, but is below 175 m for a target having a velocity of 85 m/s. As demonstrated with the SNR-range curves 31-37, increasing range migration effects reduce the SNR and degrade range performance, and also blur the range-Doppler peak, thereby reducing target resolution/separation performance. In order to recover system range performance, range migration must be circumvented or at least mitigated.

Figure 4:
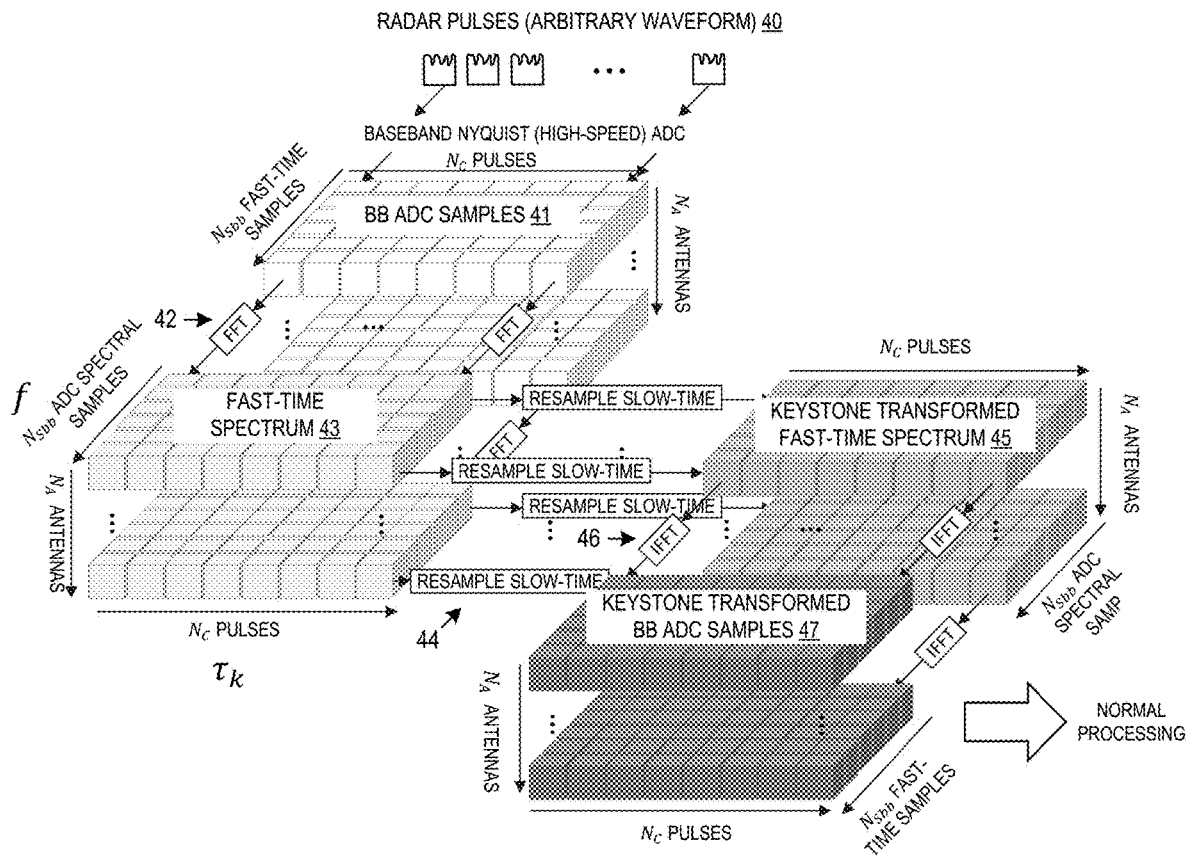
FIG. 4 shows a receiver signal processing chain diagram of an arbitrary waveform pulse doppler radar system which transforms analog/digital converter (ADC) samples using a Keystone transform process that operates directly on the pulse signals.

As indicated above, conventional radar systems have attempted to mitigate range migration by performing Keystone Transform (KST) on the pulsed Doppler radar signals to transform the migrating ranges into constant ranges so the degradation to the Doppler processing is mitigated. An example of such a conventional solution is illustrated in FIG. 4 which shows a receiver signal processing chain diagram 4 of an arbitrary waveform pulse Doppler radar system which transforms analog/digital converter (ADC) spectral domain samples using a Keystone transform process that operates directly on the pulse signals. As illustrated, a series of $N_C$ arbitrary waveform signal 40 are transmitted, and the resulting target return signals are received and sampled to create a baseband (BB) ADC sample cube 41 of $N_s$ baseband fast-time samples for $N_A$ respective antennas. The BB ADC cube samples 41 are transformed into the spectral domain by applying a first fast-time (range) FFT 42 to provide fast-time spectrum cube 43, which is then resampled with a slow-time interpolation process 44 to provide Keystone-transformed fast-time spectrum 45. Resampling in slow time may involve resampling a slow-time grid $\{\tau_k\}$ on a new grid $$\left\{\frac{f_0}{f_0+f}\tau_k\right\}$$

where f is the pulse spectrum frequency, where $f_0$ the center frequency of transmitted pulse, and where $\tau_k$ the time of pulse-k. On the Keystone-transformed fast-time spectrum cube 45, an inverse FFT 46 can then be applied to produce a Keystone-transformed BB ADC sample cube 47. With range migration effects removed from the Keystone-transformed BB ADC sample cube 47, range-FFT processing may be carried out in the fast-time dimension for every chirp, and Doppler-FFT processing may be carried out in the slow-time dimension with a resampled slow-time sample vector, thereby generating range-Doppler maps for use with subsequent radar signal processing tasks (e.g., detection, angle estimation, clustering, tracking, classification, and fusion). As seen with this example, the process of applying the Keystone transform directly to the fast-time spectral pulse signals 41 requires significant computation resources and memory footprint for carrying out the first fast-time (range) FFT 42, slow-time interpolation 44, and inverse Fourier transform 46 processing steps.

Figure 5:
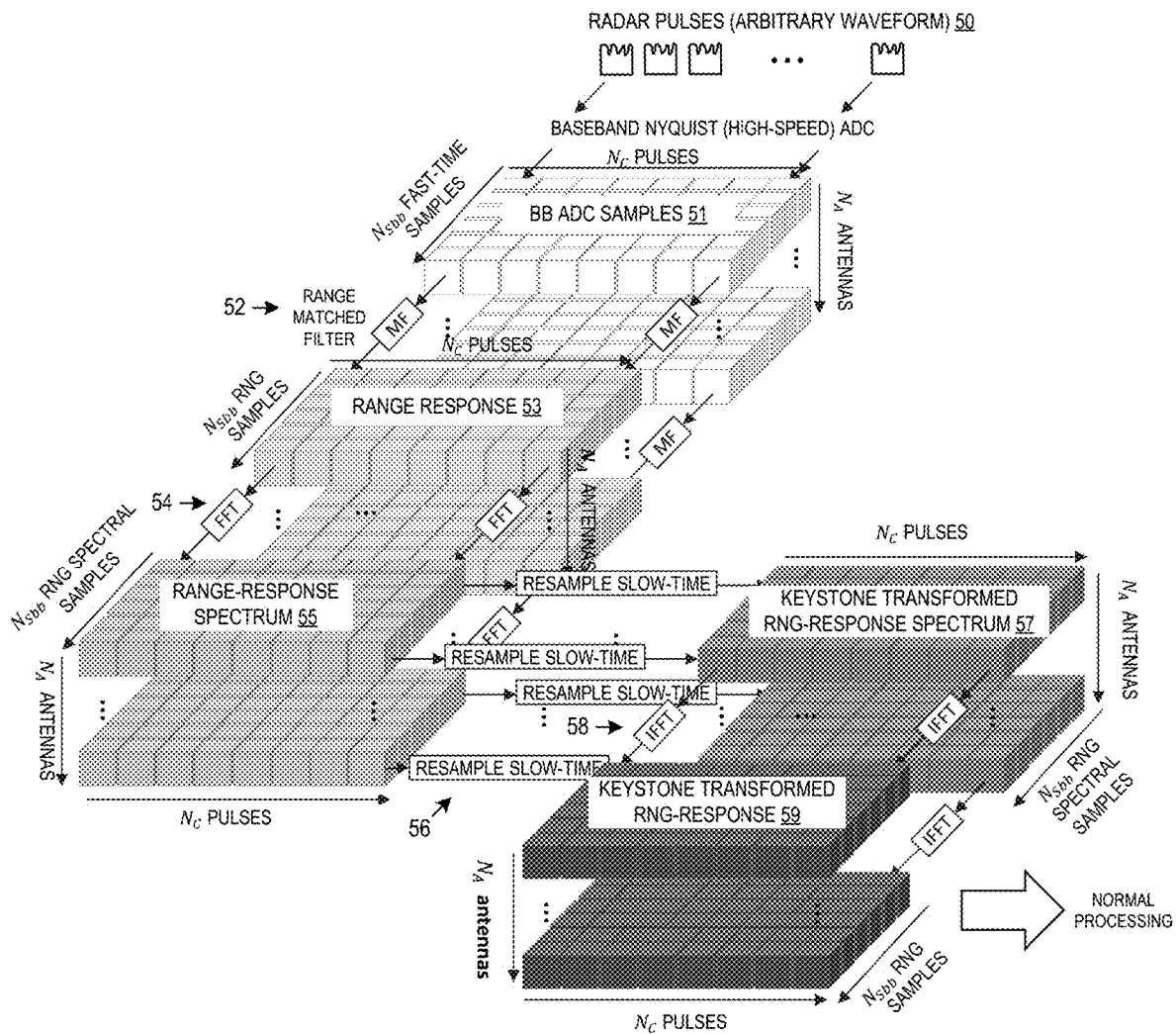
FIG. 5 shows a receiver signal processing chain diagram of an arbitrary waveform pulse doppler radar system which transforms ADC samples using a Keystone transform process that operates on the range matched filtered output.

In other conventional radar systems, range migration mitigation is addressed by performing Keystone Transform (KST) on range-matched filtered output. An example of such a conventional solution is illustrated in FIG. 5 which shows a receiver signal processing chain diagram 5 of an arbitrary waveform pulse doppler radar system which transforms ADC samples using a Keystone transform process that operates on the range matched filtered output. As illustrated, a series of $N_C$ arbitrary waveform signal 50 are transmitted, and the resulting target return signals are received and sampled to create a baseband (BB) ADC sample cube 51 of $N_s$ baseband fast-time samples for $N_A$ respective antennas. The BB ADC cube samples 51 are then filtered with a range matched filter 52 to generate the range response cube 53. The matched filtered range response 53 of each chirp (and of each antenna) is then transformed into the spectral domain by applying a first fast-time (range) FFT 54 to provide the range-response spectrum cube 55. For each spectral component of the range-response spectrum cube 55, across the slow time or chirps, a slow-time resampling or interpolation 56 is carried out based on a rescaled slow-time grid to provide the Keystone-transformed range-response spectrum cube 57, where the rescaling of the slow-time grid is a function of the frequency of the spectrum. Resampling in slow time may involve resampling a slow-time grid $\{\tau_k\}$ on a new grid $$\left\{\frac{f_0}{f_0+f}\tau_k\right\}$$

where f is the range response spectrum frequency, where $f_0$ the center frequency of transmitted pulse, and where $\tau_k$ the time of pulse-k. The Keystone-transformed range-response spectrum cube 57 may then be transformed with an inverse FFT 58 to produce a Keystone-transformed range-response cube 59 with range migration effects removed so that additional range-FFT and Doppler-FFT processing may be carried out to generate range-Doppler maps for use with subsequent radar signal processing tasks (e.g., detection, angle estimation, clustering, tracking, classification, and fusion). As seen with this example, the process of applying the Keystone transform to the range matched filtered output 53 requires significant computation resources and memory footprint for carrying out the first fast-time (range) FFT 54, slow-time interpolation 56, and inverse Fourier transform 58 processing steps.

Figure 6A:
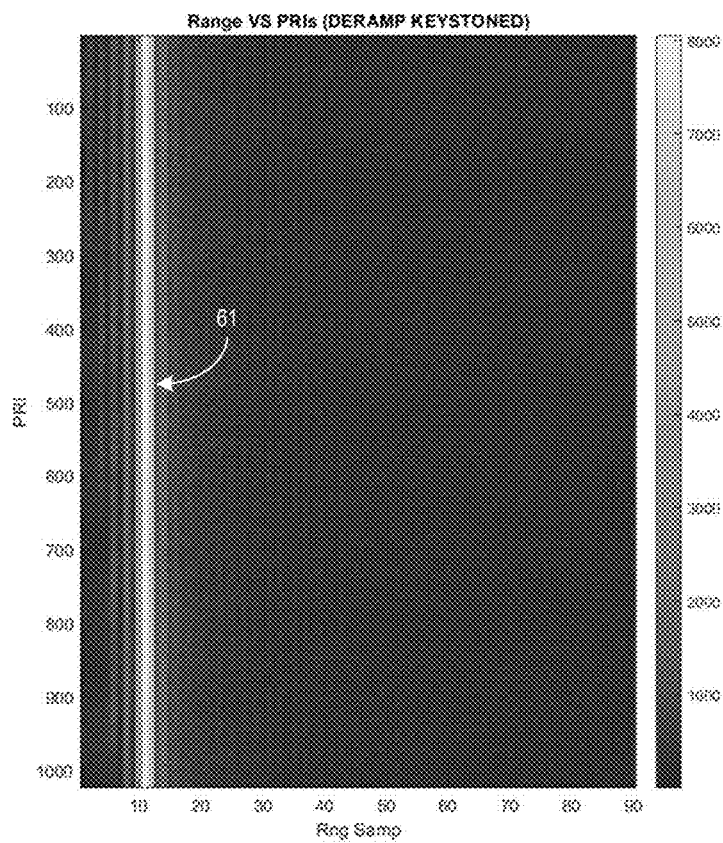
FIG. 6A shows a simulated mitigated range migration effect of a single moving target with simulated range responses of multiple chirps or pulse repetition intervals in a coherent processing interval.
Figure 6B:
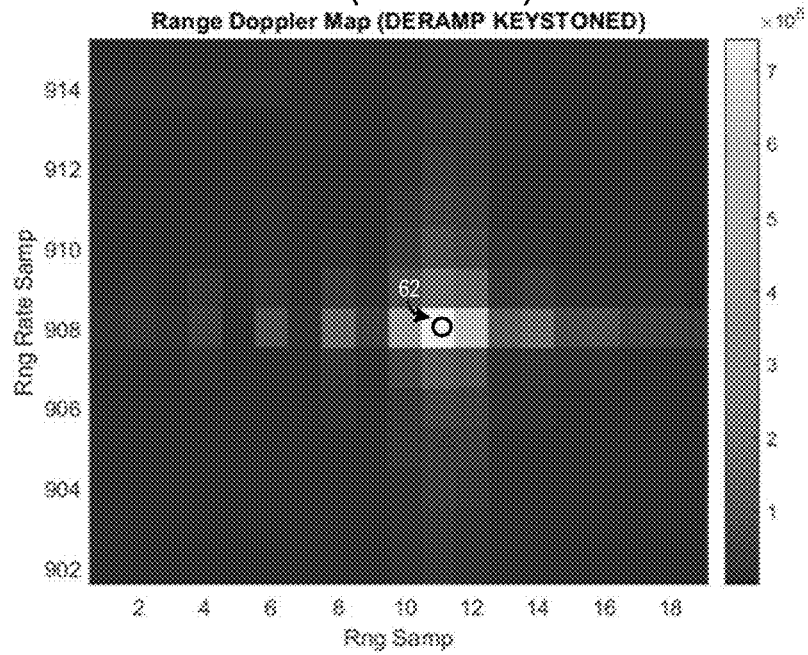
FIG. 6B shows a simulated range-doppler map response to the migration effect with range migration mitigation.

To provide additional details for an improved contextual understanding of the present disclosure, reference is now made to FIG. 6A which is a simulation 6A of multiple chirps or pulse repetition intervals (PRI) in a CPI (along the vertical axis) versus the range samples (along the horizontal axis) to show the mitigated range migration effect of a single moving target with simulated range responses of multiple chirps or pulse repetition intervals in a coherent processing interval after applying a Keystone Transformation processing. As depicted with the vertical, lighter-colored line 61, the range response becomes a constant over multiple PRIs, even when the target is moving. This results from the Keystone Transformation process which compensates all range migration within the CPI by rescaling the sampling interval with respect to each frequency component of the fast time signal in a particular way that decouples the range rate from the range in the range FFT output. As a result, the migration-mitigated target range stays within the same range cell throughout the coherent processing interval, thereby allowing the Doppler FFT to correctly integrate the signals. This result is depicted in FIG. 6B which shows a simulated range-Doppler map response 6B with range migration mitigation. In the simulated example, the actual target range and range rate values are located at cell 62 (corresponding to the $11^{th}$ range bin and the $908^{th}$ range rate bin), and since the range migration effects are mitigated, the range-Doppler map response shows a sharp peak at cell 62 with a power level (e.g., 137.4 dB) that improves the SNR by approximately 8 dB.

As indicated above, there are significant and expensive computational requirements for applying conventional KST processing to pulse-Doppler radar waveforms. However, these requirements can be simplified when considering specific waveforms, such as linear chirps. For example, with automotive radar systems based on LFM pulse-Doppler radar waveforms, the range matched filtering processing is usually carried out at the receiver unit or module by an analog deramp mixer followed by an ADC unit, and the range response is computed in the digital domain using an FFT hardware accelerator. By using an analog chirp mixer (or deramp mixer) to convert the linear chirp echo into sinusoidal tones, a much slower ADC unit can be used for digital sampling that is much less expensive than the more costly Nyquist ADC and matched filtering process. While an analog chirp mixer, intermediate frequency (IF) ADC, and range FFT cannot be used to implement the conventional KST processing illustrated in FIG. 4 since the chirp signals are not sampled, this arrangement could be used to perform the conventional KST processing illustrated in FIG. 5 by replacing the Nyquist ADC sampling and range matched filtering and adapting the receiver signal processing chain.

Figure 7:
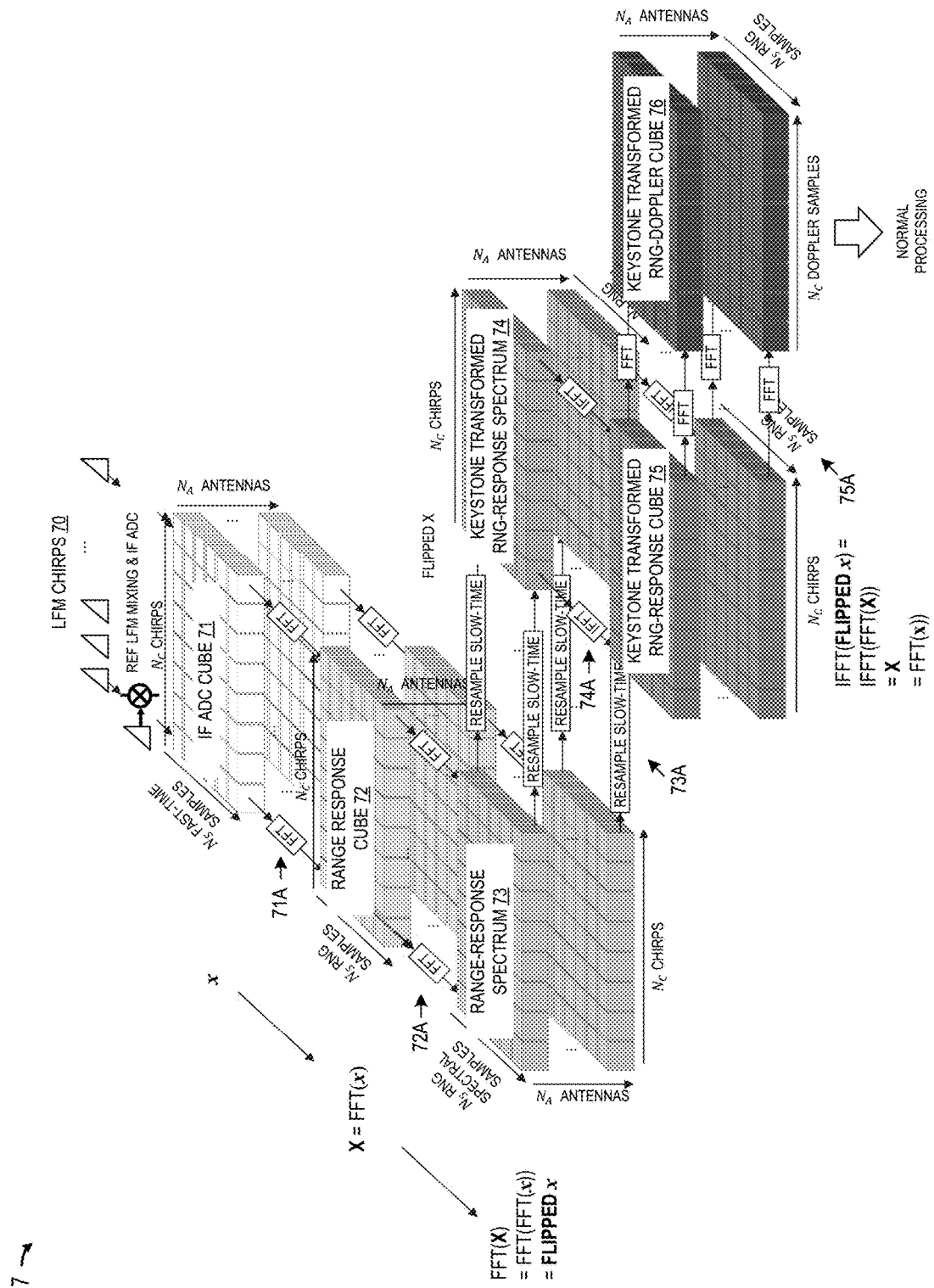
FIG. 7 shows a receiver signal processing chain diagram of an LFM pulse doppler radar system which transforms ADC samples using a conventional Keystone transform process that operates on the ADC samples.

To illustrate an example of such an adapted KST receiver signal processing chain, reference is now made to FIG. 7 which shows a receiver signal processing chain diagram 7 of an LFM pulse doppler radar system which transforms ADC samples using a conventional Keystone transform process. As depicted, a series of $N_C$ LFM chirp signals 70 are transmitted, and the resulting target return signals are received and sampled to create an intermediate frequency (IF) ADC cube 71 which includes $N_s$ fast-time samples for $N_A$ respective antennas generated by the $N_C$ LFM chirps. KST processing is then applied to the IF ADC cube 71 by using a first fast-time (range) FFT 71A to generate the range-response cube 72. The range response cube 72 is then transformed into the spectral domain by applying a second fast-time FFT 72A to provide the range-response spectrum cube 73. For each spectral component of the range-response spectrum cube 73, across the slow time or chirps, a slow-time resampling or interpolation 73A is carried out based on a rescaled slow-time grid to provide the Keystone-transformed range-response spectrum cube 74, where the rescaling of the slow-time grid is a function of the frequency of the spectrum. Resampling in slow time may involve resampling a slow-time grid $\{\tau_k\}$ on a new grid $$\left\{\frac{f_0}{f_0+f}\tau_k\right\}$$

where f is the range response spectrum frequency, where $f_0$ the center frequency of transmitted pulse, and where $\tau_k$ the time of pulse-k. The Keystone-transformed range-response spectrum cube 74 is then be transformed back to the range response domain with an inverse FFT 74A to produce a Keystone-transformed range-response cube 75 with range migration effects removed or mitigated, provided that the target radial velocity does not exceed the unambiguous radial velocity range. At this point, a third fast-time FFT 75A may be applied to provide the KST range-Doppler cube 76 for use with subsequent radar signal processing tasks (e.g., detection, angle estimation, clustering, tracking, classification, and fusion).

As seen from the foregoing, the adapted KST receiver signal processing chain can be streamlined by combining the two fast-time FFT processes 71A, 72A, slow-time resampling process 73A, and the final IFFT process 74A into a direct slow-time resampling on the ADC samples followed by the Doppler FFT process 75A. In particular, the streamlining can be understood by tracing a fast-time ADC sample vector x from the IF ADC cube 71 in the depicted KST processing steps of FIG. 7. In the first fast-time (range) FFT 71A, FFT(x) is computed to obtain the range response X=FFT(x). In the second FFT 72A, the spectrum of X, FFT(X)—or equivalently FFT(FFT(x))—is computed when generating the range-response spectrum cube 73. Due to the nature of Fourier transform, we know FFT(FFT(x)) is simply the index-reversed or flipped x. During the slow-time resampling process 73A, the slow-time samples of the range response spectra are resampled, which are still in the same (i.e. flipped x) domain. Lastly, the inverse Fourier transform process 74A computes the range response spectra, i.e. IFFT (FFT(x)). Due to the nature of the Fourier transforms, IFFT(FFT(X))=IFFT(flipped x)=X=FFT(x). As a result, the KST processing steps can be streamlined as simply conducting the slow-time resampling for the same ADC samples across chirps, and then computing the fast-time FFT to obtain the range response with range migration removed.

Figure 8:
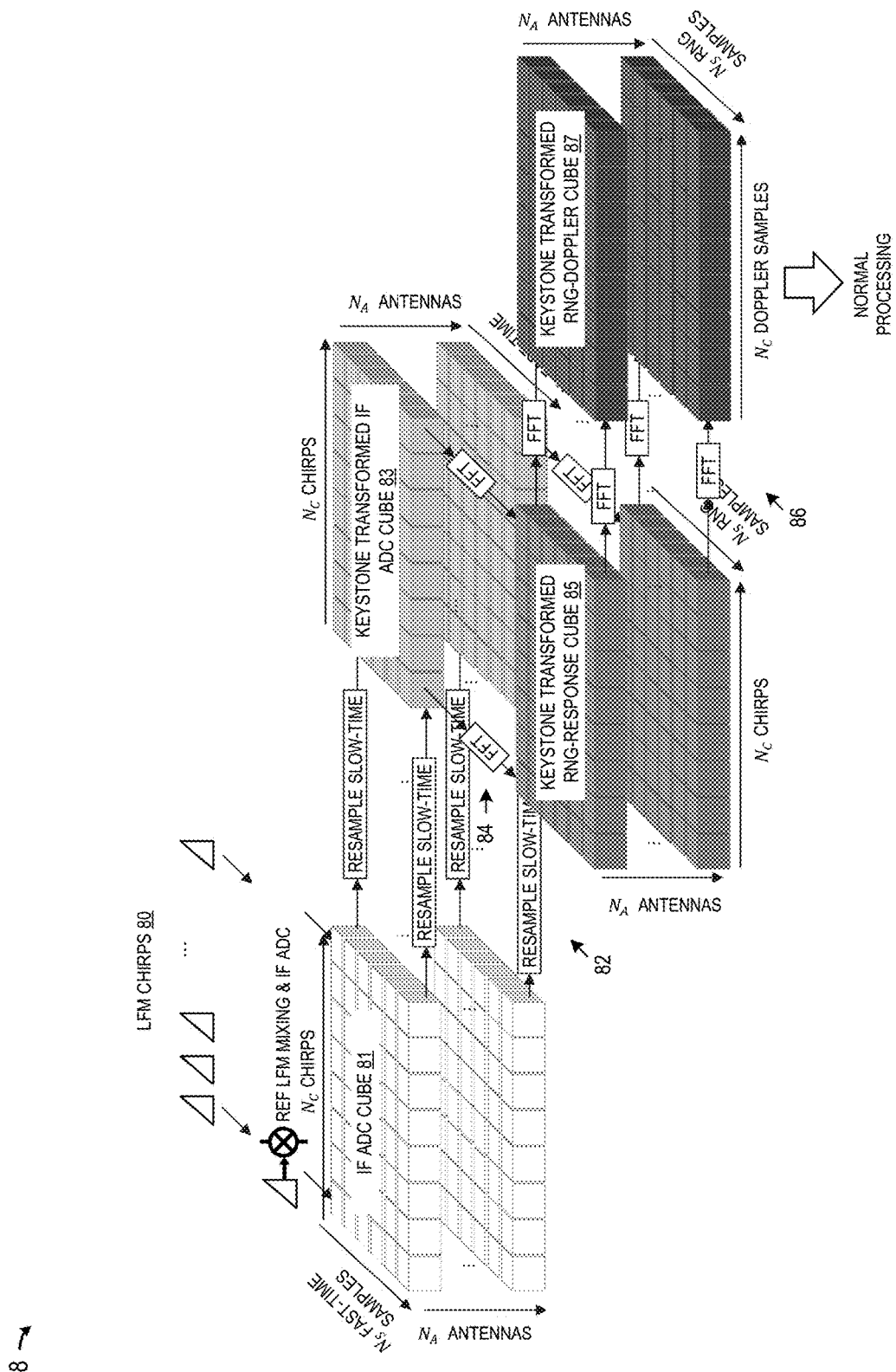
FIG. 8 shows a receiver signal processing chain diagram of an LFM pulse doppler radar system which transforms ADC samples using a streamlined Keystone transform process that operates on the ADC samples.

To illustrate an example of such a streamlined KST receiver signal processing chain, reference is now made to FIG. 8 which shows a receiver signal processing chain diagram 8 of an LFM pulse doppler radar system which transforms ADC samples using a streamlined Keystone transform process which is functionally equivalent to the conventional KST but with redundant processes eliminated which greatly improves the efficiency. As depicted, a series of $N_C$ LFM chirp signals 80 are transmitted, and the resulting target return signals are received and sampled to create an intermediate frequency (IF) ADC cube 81 which includes $N_s$ fast-time samples for $N_A$ respective antennas generated by the $N_C$ LFM chirps. KST processing is then applied to the IF ADC cube 81 by applying a slow-time resampling or interpolation 82 for the ADC samples across chirps, thereby generating a KST IF ADC cube 83. For example, the slow-time resampling process 82 may involve resampling slow-time vectors with respect to each fast-time t as follows:

$$\tau_k = \frac{f_0}{f_0+\frac{B}{T_c}t}\tau_k'$$

$$t = [0, 1, 2, \ldots, N_s-2, N_s-1]T_s$$

wherein the $\tau_k$ vector has fixed intervals of PRI. Any of the $\tau_k$ may be set to be slow time 0. The KST IF ADC cube 83 may then be processed with a first fast-time (range) FFT 84 to provide a KST range response cube 85. In addition, the KST range response cube 85 may be processed with a second slow-time (Doppler) FFT 86 to provide a KST range-Doppler cube 87 which can then be output and used for various radar processing tasks. While the depicted streamlined KST processing steps provides for more efficient processing by eliminating redundant processes, the slow-time resampling processes 82 require interpolation of the slow-time ADC samples, which can be challenging computation and memory wise.

Figure 9:
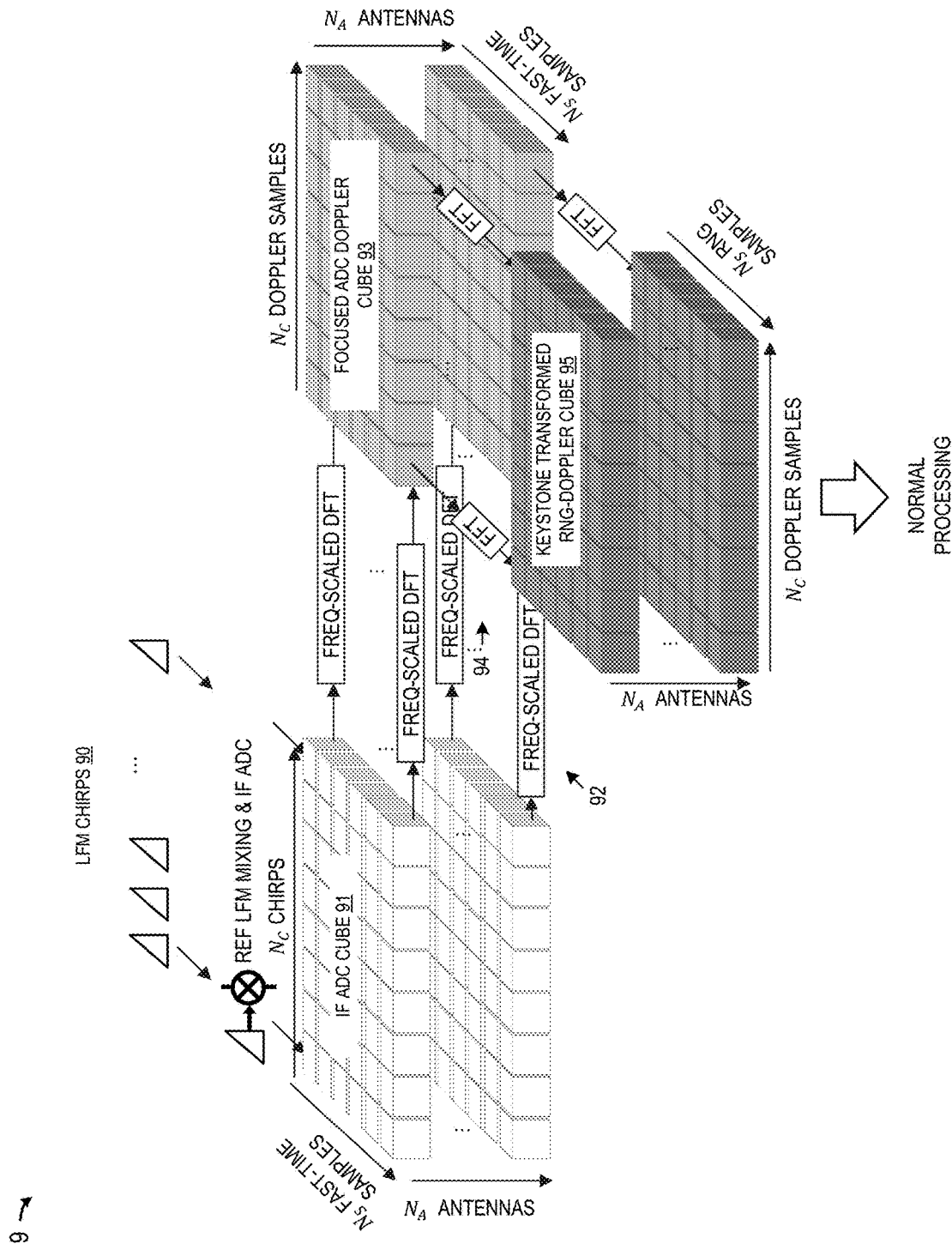
FIG. 9 shows a receiver signal processing chain diagram of an LFM pulse doppler radar system which transforms ADC samples using a streamlined Keystone transform process which includes a frequency-scaled discrete Fourier transform doppler filter in accordance with selected embodiments of the present disclosure.

To address these deficiencies from conventional approaches and others known to those skilled in the art, there is disclosed herein a method, system, and apparatus for efficiently implementing streamlined KST processing without the interpolation requirement by modifying each Doppler or Radial Velocity filter so that they are tuned to a slow-time frequency that is a function of the desired radial velocity to be evaluated and the fast-time ADC sample's time value. To provide additional details for an improved understanding of selected embodiments of the present disclosure, reference is now made to FIG. 9 which shows a receiver signal processing chain diagram 9 of an LFM pulse doppler radar system which transforms ADC samples using a streamlined Keystone transform process implemented with a frequency-scaled discrete Fourier transform doppler filter 92. As depicted, a series of $N_C$ LFM chirp signals 90 are transmitted, and the resulting target return signals are received and sampled to create an intermediate frequency (IF) ADC cube 91 which includes $N_s$ fast-time samples for $N_A$ respective antennas generated by the $N_C$ LFM chirps. In contrast to the conventional approaches (which start by correcting the range migration before computing the range and Doppler spectrums), the KST processing is applied to the IF ADC cube 91 by first applying a frequency-scaled discrete Fourier transform (DFT) process 92 to compute corrected Doppler spectrums before computing the range spectrum. In disclosed embodiments, the frequency-scaled DFT process 92 produces a focused ADC Doppler cube 93 to enable an efficient KST implementation by using recursive chirp-to-chirp processing with no extra memory footprint requirement. For example, the frequency-scaled DFT process 92 is configured to use a modified DFT filter $G_n(m, q)=\sum_{k=0}^{N_c-1}g_n(m, k) z_m^{qk}$ such that the m-th ADC sample's q-th Doppler DFT filter output is tuned to a radial velocity value $q\Delta\dot{r}$ which is scaled by a scaling factor $$\frac{f_0+\frac{B}{T_c}T_s m}{f_0}, \text{ where } z_m = e^{-j2\pi\frac{f_0(2\Delta\dot{r})}{C}\left(\frac{f_0+\frac{B}{T_c}T_s m}{f_0}\right)T_{PRI}},$$

where $f_m(k) = g_n(m, k)z_m^{\frac{k^2}{2}}$, and where $g_n(m, k)$ is the m-th ADC sample of the k-th chirp at the n-th antenna. The focused ADC Doppler cube 93 may then be processed with a first fast-time (range) FFT 94 to provide a KST range-Doppler cube 95 which can then be output and used for various radar processing tasks (e.g., detection, angle estimation, clustering, tracking, classification, and fusion).

Figure 10:
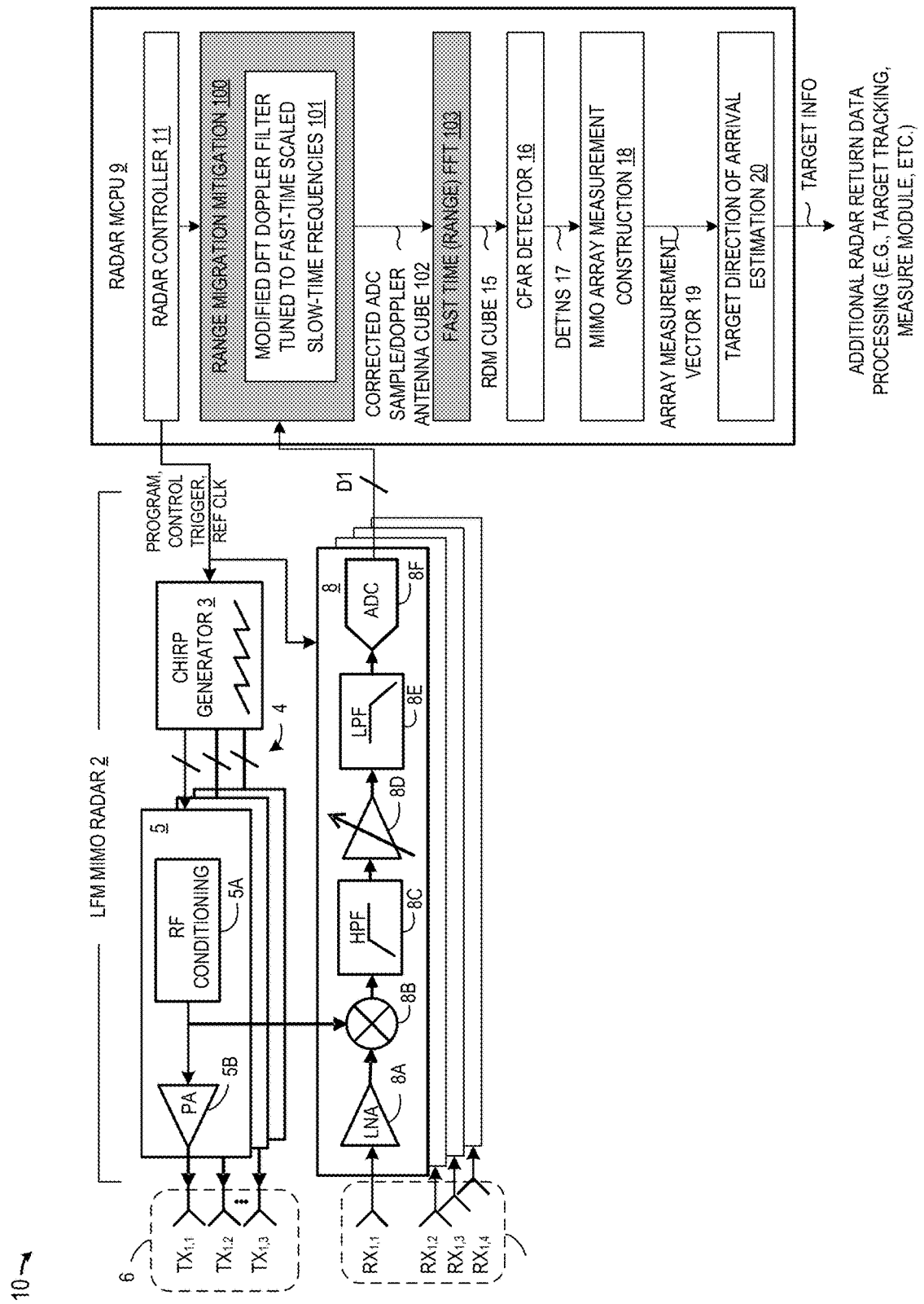
FIG. 10 is a simplified schematic block diagram of an LFM MIMO automotive radar system which uses a modified Doppler filter tuned to fast-time scaled slow-time frequencies for range migration mitigation in accordance with selected embodiments of the present disclosure.

To provide additional details for an improved contextual understanding of the selected embodiments of the present disclosure, reference is now made to FIG. 10 which depicts a simplified schematic block diagram of an LFM MIMO automotive radar system 10 which includes an LFM automotive radar front-end device 2 connected between a radar microcontroller processing unit (MCPU) 9 and a transmit antenna array 6 and receive antenna array 7 in accordance with selected embodiments of the present disclosure. Generally speaking, the overall design of the LFM MIMO automotive radar system 10 is similar to the LFM MIMO automotive radar system 1 shown in FIG. 1 except that the radar MCPU 9 includes a range migration mitigation module 100 that uses a modified Doppler filter 101 tuned to fast-time scaled slow-time frequencies for computing a corrected ADC sample/Doppler spectrum 102 before applying the fast time (range) FFT 103 to compute the range spectrum. In particular, the radar MCPU 9 is connected and configured to receive and digital signal D1 from the LFM automotive radar front-end device 2 for processing by the radar modules 100-103 to generate a range-Doppler cube 15 containing target range, Doppler (radial velocity), angle, and amplitude information in which range migration is eliminated or at least mitigated. In particular, the digital output signals D1 may be processed at the range migration mitigation module 100 with a streamlined Keystone Transform by using the modified DFT Doppler filter 101 that is tuned to slow-time frequencies $$\left(e.g., \frac{f_0(2\dot{r}_q)}{C}\right)$$

that are rescaled by a function of the fast-time sample (e.g., $$\left(e.g., \left[\frac{f_0 + \frac{B}{T_c}T_s m}{f_0}\right]\right).$$

In selected embodiments, the processing by the modified DFT Doppler filter 101 may be streamlined by arranging the modified DFT into the discrete convolution form which is then implemented as a frequency domain convolution process using Fast Fourier Transform and Inverse Fast Fourier Transform processes. Subsequently, the fast-time (range) FFT 103 is applied down the fast-time dimension for each range cell to output a range-Doppler map 15 for each receiver channel, all without requiring interpolation operation. In turn, the RDM cube 15 is passed through one or more constant false alarm rate (CFAR) detector modules 16 to obtain the range-Doppler peak detections 17 which are processed by the MIMO array measurement construction module 18 to construct array measurement vectors 19 for use by the target direction of arrival estimation module 20 to estimate the direction of arrival for the target return(s). In addition, there are one or more additional radar return data processing steps that may be performed, such as target tracking processing and measurement processing, with the result being output to other automotive computing or user interfacing devices for further process or display.

For an improved understanding of how the range migration mitigation module 100 computes corrected Doppler spectrums from the ADC samples by applying the modified DFT Doppler filter, the deramp mixer output of the n-th receiver for the k-th chirp is denoted as $g_{n,k}(t)$, where $1 \leq k \leq N_c$ and $N_c$ is the number of chirps. In addition, t denotes the fast-time time variable with each chirp which starts at t=0 so that $t=t_1, t_2, \ldots t_{N_s}=[0, 1, 2, \ldots, N_s-2, N_s-1]T_s$, where $N_s$ is the number ADC samples acquired per chirp, and where $T_s$ is the sampling interval. Assuming there are L targets, then the deramp mixer output $g_{n,k}(t)$ can be modelled in the following equation:

$$g_{n,k}(t) = \sum_{i=1}^{L} \alpha_i e^{j2\pi\left(f_0 \frac{(r_{T,i}(t) + r_{n,i}(t))}{C} + \frac{B}{T_c}\frac{(r_{T,i}(t) + r_{n,i}(t))}{C}t - \frac{B}{2T_c}\left(\frac{r_{T,i}(t) + r_{n,i}(t)}{C}\right)^2\right)}$$

$$\cong \sum_{i=1}^{L} \alpha_i e^{j2\pi\left(f_0 \frac{(r_{T,i}(t) + r_{n,i}(t))}{C} + \frac{B}{T_c}\frac{(r_{T,i}(t) + r_{n,i}(t))}{C}t\right)},$$

where $\alpha_i$ is the amplitude of the i-th target; $f_0$ is the chirp's center frequency; B is the chirp bandwidth; $T_c$ is the chirp ADC acquisition duration (such that $$\frac{B}{T_c}$$

is the chirp rate); $r_{T,i}$ is the departing range from the transmitter to the i-th target; and $r_{n,i}$ is the arriving range from the i-th target back to the n-th receiver.

For most of the automotive radar use cases, the relative radial motion of the target can be approximated using a simpler linear radial motion model. For example, if $\tau$ denotes the slow-time time variable whose value changes at chirp starts to the absolute chirp starting time and remains constant until next chirp start (e.g., $\tau=(k-1)*T_{PRI}$ for $(k-1)*T_{PRI} \leq t < k*T_{PRI}$ where $T_{PRI}$ is the time interval between two adjacent chirps' chirp starts), then the round-trip range function (e.g., the sum of $r_{T,i}$ and $r_{n,i}$) can be written in the following simpler format where $\dot{r}_{Ti}$ and $\dot{r}_{ni}$ is indicate the range rates:

$$r_{T,i}(t) + r_{n,i}(t) \cong r_{Ti} + \dot{r}_{Ti}\tau + r_{ni} + \dot{r}_{ni}\tau.$$

Applying the linear radial motion approximation, the deramp mixer output can be written as the following equation.

$$g_{n,k}(t, \tau) \cong \sum_{i=1}^{L} \alpha_i e^{j2\pi\left(f_0 \frac{r_{Ti} + \dot{r}_{Ti}\tau + r_{ni} + \dot{r}_{ni}\tau}{C} + \frac{B}{T_c}\frac{r_{Ti} + \dot{r}_{Ti}\tau + r_{ni} + \dot{r}_{ni}\tau}{C}t\right)}$$

$$= \sum_{i=1}^{L} \alpha_i e^{j\frac{2\pi}{C}(f_0(r_{Ti} + r_{ni} + (\dot{r}_{Ti} + \dot{r}_{ni})\tau))} e^{j2\pi\left(\frac{B(r_{Ti} + r_{ni} + (\dot{r}_{Ti} + \dot{r}_{ni})\tau)}{CT_c}\right)t}$$

$$= \sum_{i=1}^{L} \alpha_i e^{j\frac{2\pi}{C}(f_0(r_{Ti} + r_{ni} + (\dot{r}_{Ti} + \dot{r}_{ni})\tau))} e^{j2\pi\left(\frac{B(r_{Ti} + r_{ni})}{CT_c}\right)t} e^{j2\pi\left(\frac{B(\dot{r}_{Ti} + \dot{r}_{ni})\tau}{CT_c}\right)t}$$

$$= \sum_{i=1}^{L} \alpha_i e^{j\frac{2\pi}{C}\left(f_0(r_{Ti} + r_{ni}) + \frac{B(r_{Ti} + r_{ni})}{T_c}t + \left(f_0(\dot{r}_{Ti} + \dot{r}_{ni}) + \frac{B(\dot{r}_{Ti} + \dot{r}_{ni})}{T_c}t\right)\tau\right)}$$

$$= \sum_{i=1}^{L} \alpha_i e^{j\frac{2\pi}{C}\left(f_0(r_{Ti} + r_{ni}) + \frac{B(r_{Ti} + r_{ni})}{T_c}t\right)} e^{j\frac{2\pi}{C}\left(f_0(\dot{r}_{Ti} + \dot{r}_{ni}) + \frac{B(\dot{r}_{Ti} + \dot{r}_{ni})}{T_c}t\right)\tau}$$

$$= \sum_{i=1}^{L} \alpha_i e^{j\frac{2\pi}{C}\left(f_0(r_{Ti} + r_{ni}) + \frac{B(r_{Ti} + r_{ni})}{T_c}t\right)} e^{j\frac{2\pi}{C}(\dot{r}_{Ti} + \dot{r}_{ni})\left(f_0 + \frac{B}{T_c}t\right)\tau}$$

-continued $$= \sum_{i=1}^{L} \alpha_i e^{j\frac{2\pi}{C}\left(f_0(r_{Ti}+r_{ni})+\frac{B(r_{Ti}+r_{ni})}{T_c}t\right)} e^{j2\pi\frac{f_0(\dot{r}_{Ti}+\dot{r}_{ni})}{C}\left(\frac{f_0+\frac{B}{T_c}t}{f_0}\right)\tau}.$$

In the above equation, it will be appreciated that, for conventional Keystone Transform approaches, the slow-time variable $\tau$ is replaced with a new slow-time variable $\tau'$, where $$\tau = \frac{f_0}{f_0 + \frac{B}{T_c}t}\tau'.$$

As a result, the second exponential term will be reduced to only a function of $\tau'$ such that the undesirable fast-time slow-time coupling is mitigated. This change of variable implies the slow-time measurements need to be resampled differently as a function of the fast time sampling time. With conventional KST approaches, it is not feasible to sample differently in slow-time with respect to each fast-time sample, so interpolations are used to approximate the desired slow-time measurements, but such interpolation computations are computationally complex and expensive in terms of memory requirements.

In order to avoid the challenges involved with computing interpolations, the range migration mitigation module 100 uses the modified DFT Doppler filter 101 to implement a modified Fourier transform. To this end, the slow-time and fast-time time variables $t$ and $\tau$ are discretized such that $t=T_s m$ and $\tau=T_{PRI} k$, where $m=0, 1, 2, \ldots N_s-1$ and $k=0, 1, 2, \ldots N_c-1$. As a result, the deramp mixer output $g_{n,k}(m, k)$ can be modelled in the following equation which represents the m-th ADC sample of the k-th chirp at the n-th antenna:

$$g_n(m, k) = \sum_{i=1}^{L} \alpha_i e^{j\frac{2\pi}{C}\left(f_0(r_{Ti}+r_{ni})+\frac{B(r_{Ti}+r_{ni})}{T_c}T_s m\right)} e^{j2\pi\frac{f_0(\dot{r}_{Ti}+\dot{r}_{ni})}{C}\left(\frac{f_0+\frac{B}{T_c}T_s m}{f_0}\right)T_{PRI}k}.$$

In order to compute an output from the radial-velocity filter (of index q, q=0, 1, 2, . . . ), a modified slow-time Discrete Fourier transform $G_n(m, \dot{r}_q)$ is constructed that represents the output of the q-th modified Doppler filter which is tuned to a radial velocity of $\dot{r}_q$ for the m-th ADC sample position and the n-th antenna:

$$G_n(m, \dot{r}_q) = \sum_{k=0}^{N_c-1} g_n(m, k) e^{-j2\pi\frac{f_0(2\dot{r}_q)}{C}\left[\frac{f_0+\frac{B}{T_c}T_s m}{f_0}\right]T_{PRI}k}.$$

As depicted, the modified slow-time Discrete Fourier transform $G_n(m, \dot{r}_q)$ is implemented to obtain a range migration mitigated Doppler (or Radial Velocity) spectrum. In particular, it can be observed that, when $\dot{r}_q=(\dot{r}_{Ti}+\dot{r}_{ni})/2$, the maximum slow-time coherent integration gain for the i-th target is obtained (which achieves the maximum coherent integration gain of $N_c$). In addition, it will be noted that the DFT is tuned to slow-time frequencies $$\left(i.e., \frac{f_0(2\dot{r}_q)}{C}\right)$$

that have been rescaled by a function of fast-time sample, namely by a rescaling factor of $$\left[\frac{f_0+\frac{B}{T_c}T_s m}{f_0}\right].$$

As a result, the range migration effect is reduced or mitigated as demonstrated by the following derivations, starting from the modified slow-time Discrete Fourier transform $G_n(m, \dot{r}_q)$ equation and replacing the $\dot{r}_q$ and $g_n(m, k)$ terms before simplifying the equation $$G_n(m, \dot{r}_q) = \sum_{k=0}^{N_c-1} g_n(m, k) e^{-j2\pi\left(\frac{f_0(\dot{r}_{Ti}+\dot{r}_{ni})}{C}\right)\left[\frac{f_0+\frac{B}{T_c}T_s m}{f_0}\right]T_{PRI}k} =$$

$$\sum_{k=0}^{N_c-1} \sum_{i=1}^{L} \alpha_i e^{j\frac{2\pi}{C}\left(f_0(r_{Ti}+r_{ni})+\frac{B(r_{Ti}+r_{ni})}{T_c}T_s m\right)} e^{j2\pi\frac{f_0(\dot{r}_{Ti}+\dot{r}_{ni})}{C}\left[\frac{f_0+\frac{B}{T_c}T_s m}{f_0}\right]T_{PRI}k}$$

$$e^{-j2\pi\frac{f_0(\dot{r}_{Ti}+\dot{r}_{ni})}{C}\left[\frac{f_0+\frac{B}{T_c}T_s m}{f_0}\right]T_{PRI}k} = \sum_{k=0}^{N_c-1}\sum_{i=1}^{L} \alpha_i e^{j\frac{2\pi}{C}\left(f_0(r_{Ti}+r_{ni})+\frac{B(r_{Ti}+r_{ni})}{T_c}T_s m\right)} e^{j0} =$$

$$N_c \sum_{i=1}^{L} \alpha_i e^{j\frac{2\pi}{C}\left(f_0(r_{Ti}+r_{ni})+\frac{B(r_{Ti}+r_{ni})}{T_c}T_s m\right)}$$

As this equation demonstrates, the modified Fourier transform coherently integrates the slow-time measurements despite the range migration.

Upon assuming further that the $\dot{r}_q$ term is quantized where $\dot{r}_q=q\Delta\dot{r}$ (where $q=0, 1, 2, \ldots N_c$), it will be appreciated that the typical quantization step size $\Delta\dot{r}$ should be no greater than the radial velocity resolution of the system. Setting the quantization to be equal to the resolution, $$\Delta\dot{r} = \frac{C}{f_0 2T_{PRI} N_c} = \frac{\lambda}{2T_{PRI} N_c}$$

and letting $$z_m = e^{-j2\pi\frac{f_0(2\Delta\dot{r})}{C}\left(\frac{f_0+\frac{B}{T_c}T_s m}{f_0}\right)T_{PRI}},$$

the modified slow-time Discrete Fourier transform $G_n(m, \dot{r}_q)$ equation can be rewritten with the following equation:

$$G_n(m, q) = \sum_{k=0}^{N_c-1} g_n(m, k) e^{-j2\pi\frac{f_0(2q\Delta\dot{r})}{C}\left(\frac{f_0+\frac{B}{T_c}T_s m}{f_0}\right)T_{PRI}k} = \sum_{k=0}^{N_c-1} g_n(m, k) z_m^{qk}$$

where $G_n(m, q)$ represents the output of the q-th modified Doppler filter for the m-th ADC sample position and the n-th antenna. With this equation, it will be noted that $G_n(m, q)$ peaks at any q when $q\Delta\dot{r}$ is closest to any of the $(\dot{r}_{Ti}+\dot{r}_{ni})/2$ values, where $i=1 \ldots L$.

In order to apply the modified Discrete Fourier transform filter $G_n(m, q)$, the range migration mitigation module 100 may be configured to compute the range migration mitigated Doppler (or radial velocity) spectrums for each ADC sampling time, recursively chirp-by-chirp, until last chirp is processed. In particular, for the first chirp (k=0), the range migration mitigation module 100 computes $$\check{G}_n(m, q, k) = g_n(m, k) e^{-j2\pi \frac{f_0(2q\Delta\dot{r})}{C} \left[\frac{f_0 + \frac{B}{T_c} T_s m}{f_0}\right] T_{PRI} k}$$

for all ADC sample positions (m's) and for all Doppler bin positions (q's) and for all receive channels (n's). The computed $\check{G}_n$(m, q, k) values are then stored in the (m, q, k)-indexed focused ADC-Doppler data cube. For the subsequent chirps (k=1, 2, . . . $N_c$–1), the range migration mitigation module 100 computes $\check{G}_n$(m, q, k) and accrues them to the corresponding focused ADC-Doppler data cube entries. In this computation, $g_n$(m, k) is the m-th ADC sample of the k-th chirp at the n-th antenna which is input to the range migration mitigation module 100, m=0, 1, 2, . . . $N_s$–1 (where $N_s$ is the number ADC samples acquired per chirp), k=0, 1, 2, . . . $N_c$–1 (where $N_c$ is the number of chirps), q=0, 1, 2, . . . $N_d$–1 (where $N_d$ is the number of Doppler bins and usually $N_d$=$N_c$). In addition, the computation uses known or precomputed values, including $T_s$ (the sampling interval), $f_0$ (the chirp's center frequency), B (the chirp bandwidth), $T_c$ (the chirp ADC acquisition duration, such that $$\frac{B}{T_c}$$

is the chirp rate), $$\Delta \dot{r} = \frac{C}{f_0 2 T_{PRI} N_d} = \frac{\lambda}{2 T_{PRI} N_d}$$

(the Doppler bin size and if $N_d$=$N_c$ it is also the Doppler resolution), $T_{PRI}$ (the slow-time Doppler sampling time interval, i.e. pulse repetition interval). As a result, the focused ADC-Doppler data cube entries includes range migration mitigated Doppler (or radial velocity) spectrums. Subsequently, radar MCPU computes the range spectrum of each Doppler bin by performing Doppler FFT (on samples across the m's dimension in the data cube).

As disclose herein, the modified DFT process may be simplified to further streamline the KST process by arranging the modified DFT into the discrete convolution form for implementation in the frequency domain using the convolution theorem. To understand the process of implementing the modified DFT as a convolution computation, reference is made to the following derivation from the modified Doppler filter equation:

$$G_n(m, q) = \sum_{k=0}^{N_c-1} g_n(m, k) z_m^{qk} = z_m^{\frac{q^2}{2}} \sum_{k=0}^{N_c-1} g_n(m, k) z_m^{\frac{k^2}{2}} z_m^{-\frac{q^2}{2}} z_m^{qk} z_m^{-\frac{k^2}{2}} =$$

$$z_m^{\frac{q^2}{2}} \sum_{k=0}^{N_c-1} \left(g_n(m, k) z_m^{\frac{k^2}{2}}\right) z_m^{-\frac{(q-k)^2}{2}} = z_m^{\frac{q^2}{2}} \sum_{k=0}^{N_c-1} f_m(k) h_m(q-k) = z_m^{\frac{q^2}{2}} \Phi(q)$$

where $f_m(k) = g_n(m, k) z_m^{\frac{k^2}{2}}$; where $h_m(k) = z_m^{-\frac{k^2}{2}}$;

and where $\Phi$(q) is the convolution of $f_m$ and $h_m$ in the slow-time domain.

Figure 11:
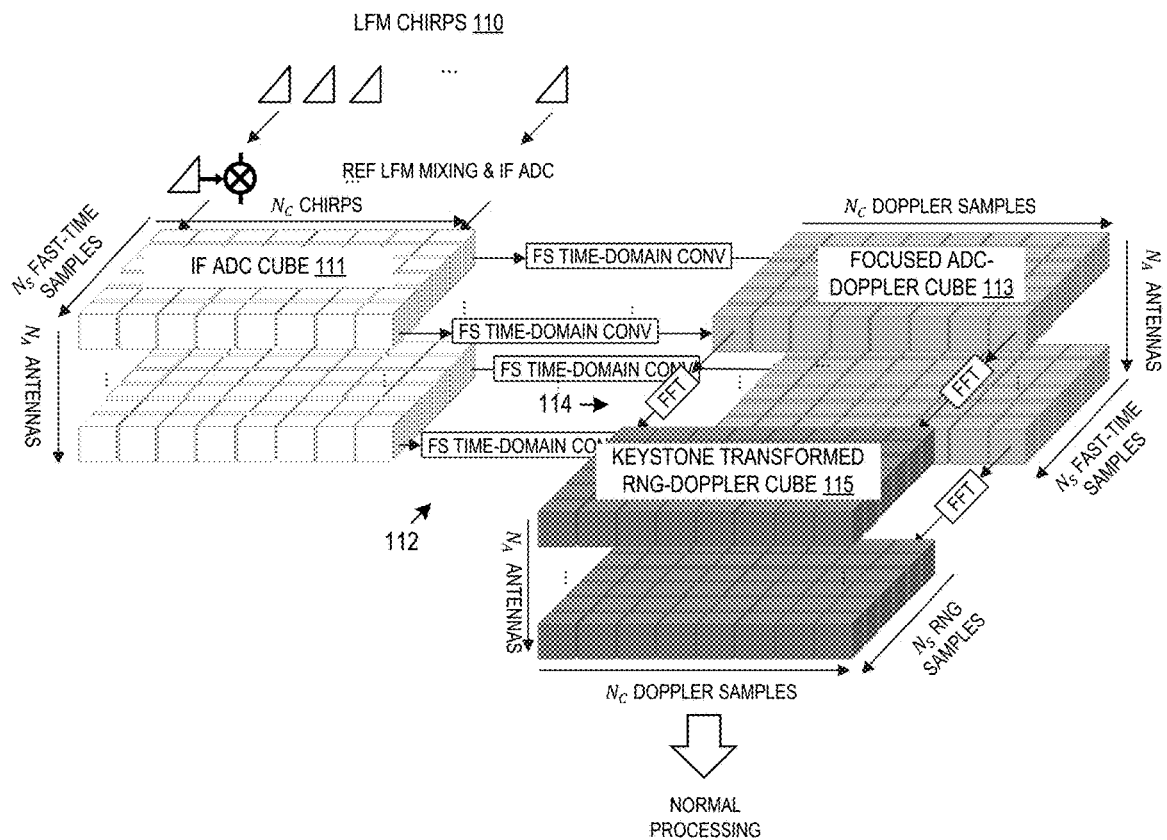
FIG. 11 shows a receiver signal processing chain diagram of an LFM pulse doppler radar system which transforms ADC samples using a streamlined Keystone transform process which includes a time domain convolution-based frequency-scaled discrete Fourier transform Doppler filter in accordance with selected embodiments of the present disclosure.

To provide additional details for an improved understanding of selected embodiments of the present disclosure, reference is now made to FIG. 11 which shows a receiver signal processing chain diagram 11 of an LFM pulse doppler radar system which transforms ADC samples using a streamlined Keystone transform process implemented with a time domain convolution-based frequency-scaled discrete Fourier transform Doppler filter 112. As depicted, a series of $N_C$ LFM chirp signals 110 are transmitted, and the resulting target return signals are received and sampled to create an intermediate frequency (IF) ADC cube 111 which includes $N_s$ fast-time samples for $N_A$ respective antennas generated by the $N_C$ LFM chirps. Instead of starting by correcting the range migration before computing the range and Doppler spectrums, the KST processing is applied to the IF ADC cube 111 by first applying a frequency-scaled time-domain convolution process 112 which implements a frequency-scaled DFT to compute the corrected or focused ADC Doppler cube 113 before computing the KST range-Doppler spectrum 115. For example, the frequency-scaled time-domain convolution process 112 may be configured to use a modified DFT filter where the q-th Doppler DFT filter output of the modified DFT filter $$G_n(m, q) = z_m^{\frac{q^2}{2}} \Phi(q)$$

when tuned to radial velocity $q\Delta\dot{r}$, where $\Phi(q) = f_m \otimes h_m = \Sigma_{k+0}^{N_c-1} f_m(k) h_m(q-k)$; where $$z_m = e^{-j2\pi \frac{f_0(2\Delta\dot{r})}{C} \left(\frac{f_0 + \frac{B}{T_c} T_s m}{f_0}\right) T_{PRI}};$$

where $h_m(k) = z_m^{-\frac{k^2}{2}}$; where $f_m(k) = g_n(m, k) z_m^{\frac{k^2}{2}}$;

and where $g_n$(m, k) is the m-th ADC sample of the k-th chirp at the n-th antenna.

As disclosed herein, the convolution operation $\Phi(q) = f_m \otimes h_m$ can be efficiently implemented using (Fast) Fourier Transform and Inverse (Fast) Fourier Transform according to the convolution theorem, as set forth below:

$$\Phi(q) = \sum_{k=0}^{N_c-1} f_m(k) h_m(q-k) = f_m \otimes h_m = \mathcal{F}^{-1}\{\mathcal{F}\{f_m\}\mathcal{F}\{h_m\}\}.$$

Because the time-domain convolution process 112 relies on a Fourier Transform, it can be efficiently implemented using Fast Fourier Transform and Fast Inverse Fourier Transform which are supported by hardware accelerators of many automotive radar microprocessor chips.

Having applied the time-domain convolution process 112, the focused ADC Doppler cube 113 is generated to provide the range-migration mitigated Doppler spectrum for each ADC sample across the slow-time. The next processing step is to generate the range spectrum for each Doppler cell.

Since the effect of range migration is removed at this point, the focused ADC Doppler cube 113 may be processed with a first fast-time (range) FFT 114 to provide a KST range-Doppler cube 115 which can then be output and used for various radar processing tasks (e.g., detection, angle estimation, clustering, tracking, classification, and fusion). In particular, the fast-time Discrete Fourier Transform of $G_n(m, q)$ tuned to $r_p$ may be implemented as the following equation where $\mathcal{G}_n(r_p, q)$ which represents the output of the q-th modified Doppler filter and the range filter that is tuned to $r_p$ at the n-th antenna:

$$\mathcal{G}_n(r_p, q) = \sum_{m=0}^{N_s-1} G_n(m, q) e^{-j\frac{2\pi}{C}\left(\frac{B(2r_p)}{T_c}T_s m\right)}.$$

In this equation, when $r_p = (r_{Ti} + r_{ni})/2$ (for an i-th target), the maximum fast-time coherent integration gain ($N_s$) is achieved for the target and a range spectrum peak corresponding to the range of the target is obtained.

Upon assuming that $r_p$ is quantized where $r_p = \Delta r(p-1)$, the equation $\mathcal{G}_n(r_p, q)$ can be rewritten as the following equation $\mathcal{G}_n(p, q)$ to represent the output of the q-th modified Doppler filter and the p-th range filter for the n-th antenna:

$$\mathcal{G}_n(p, q) = \sum_{m=0}^{N_s-1} G_n(m, q) e^{-j\frac{2\pi}{C}\left(\frac{B(2\Delta r p)}{T_c}T_s m\right)}.$$

As seen from the foregoing, the equation $\mathcal{G}_n(p, q)$ peaks at any p and q when $p\Delta r \cong (r_{Ti} + r_{ni})/2$ and $q\Delta \dot{r} \cong (\dot{r}_{Ti} + \dot{r}_{ni})/2$ for any $i \in \{1 \ldots L\}$. As a result of the foregoing, the equation $\mathcal{G}_n(p, q)$ represents the range-Doppler spectrum of antenna-n. Note that range migration is mitigated in the producing of this 2-D spectrum.

In practice, all of the Discrete Fourier Transform processes can be carried out using Fast Fourier Transform; however, the integer-$2\pi$ periodic spectrum ambiguities need to be handled properly if any target's radial velocity cannot be sampled unambiguously.

Figure 12:
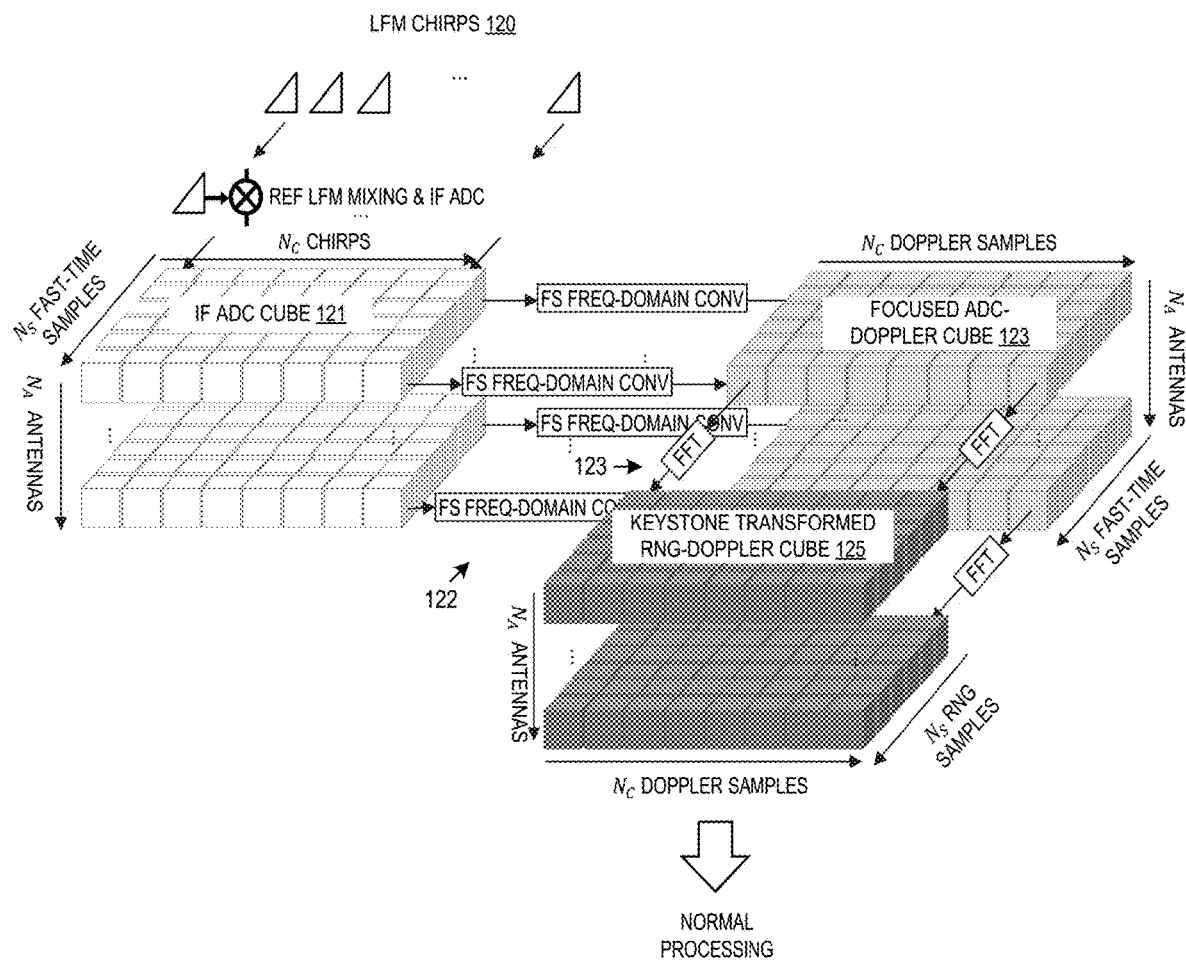
FIG. 12 shows a receiver signal processing chain diagram of an LFM pulse doppler radar system which transforms ADC samples using a streamlined Keystone transform process which includes a frequency domain convolution-based frequency-scaled discrete Fourier transform Doppler filter in accordance with selected embodiments of the present disclosure.

In similar fashion, the modified DFT process may be simplified to implement the streamlined KST process in the time domain using the convolution theorem. To provide additional details for an improved understanding of selected embodiments of the present disclosure, reference is now made to FIG. 12 which shows a receiver signal processing chain diagram 12 of an LFM pulse doppler radar system which transforms ADC samples using a streamlined Keystone transform process implemented with a frequency domain convolution-based frequency-scaled discrete Fourier transform Doppler filter 122. As depicted, a series of $N_C$ LFM chirp signals 120 are transmitted, and the resulting target return signals are received and sampled to create an intermediate frequency (IF) ADC cube 121 which includes $N_s$ fast-time samples for $N_A$ respective antennas generated by the $N_C$ LFM chirps. Next, the IF ADC cube 121 is processed by applying a frequency-scaled frequency-domain convolution process 122 which implements a frequency-scaled DFT to compute the corrected or focused ADC Doppler cube 123 before computing the KST range-Doppler spectrum 125. For example, the frequency-scaled frequency-domain convolution process 122 may be is configured to use a modified DFT filter where the q-th Doppler DFT filter output of the modified DFT filter $$G_n(m, q) = z_m^{\frac{q^2}{2}} \Phi(q)$$

when tuned to radial velocity $q\Delta \dot{r}$, where $\Phi(q) = \mathcal{F}^{-1}\{\mathcal{F}\{f_m(k)\} \mathcal{F}\{h_m\}\} = f_m \otimes h_m = \sum_{k=0}^{N_c-1} f_m(k) h_m(q-k)$; where $$z_m = e^{-j2\pi \frac{f_0(2\Delta \dot{r})}{C}\left(\frac{f_0 + \frac{B}{T_c}T_s m}{f_0}\right)T_{PRI}};$$

where $h_m(k) = z_m^{-\frac{k^2}{2}}$; where $f_m(k) = g_n(m, k) z_m^{\frac{k^2}{2}}$;

and where $g_n(m, k)$ is the m-th ADC sample of the k-th chirp at the n-th antenna. The focused ADC Doppler cube 123 may then be processed with a first fast-time (range) FFT 124 to provide a KST range-Doppler cube 125 which can then be output and used for various radar processing tasks (e.g., detection, angle estimation, clustering, tracking, classification, and fusion).

Because the frequency-domain convolution process 122 relies on Fourier Transform, it can be efficiently implemented using Fast Fourier Transform and Fast Inverse Fourier Transform which are supported by hardware accelerators of many automotive radar microprocessor chips.

Figure 13:
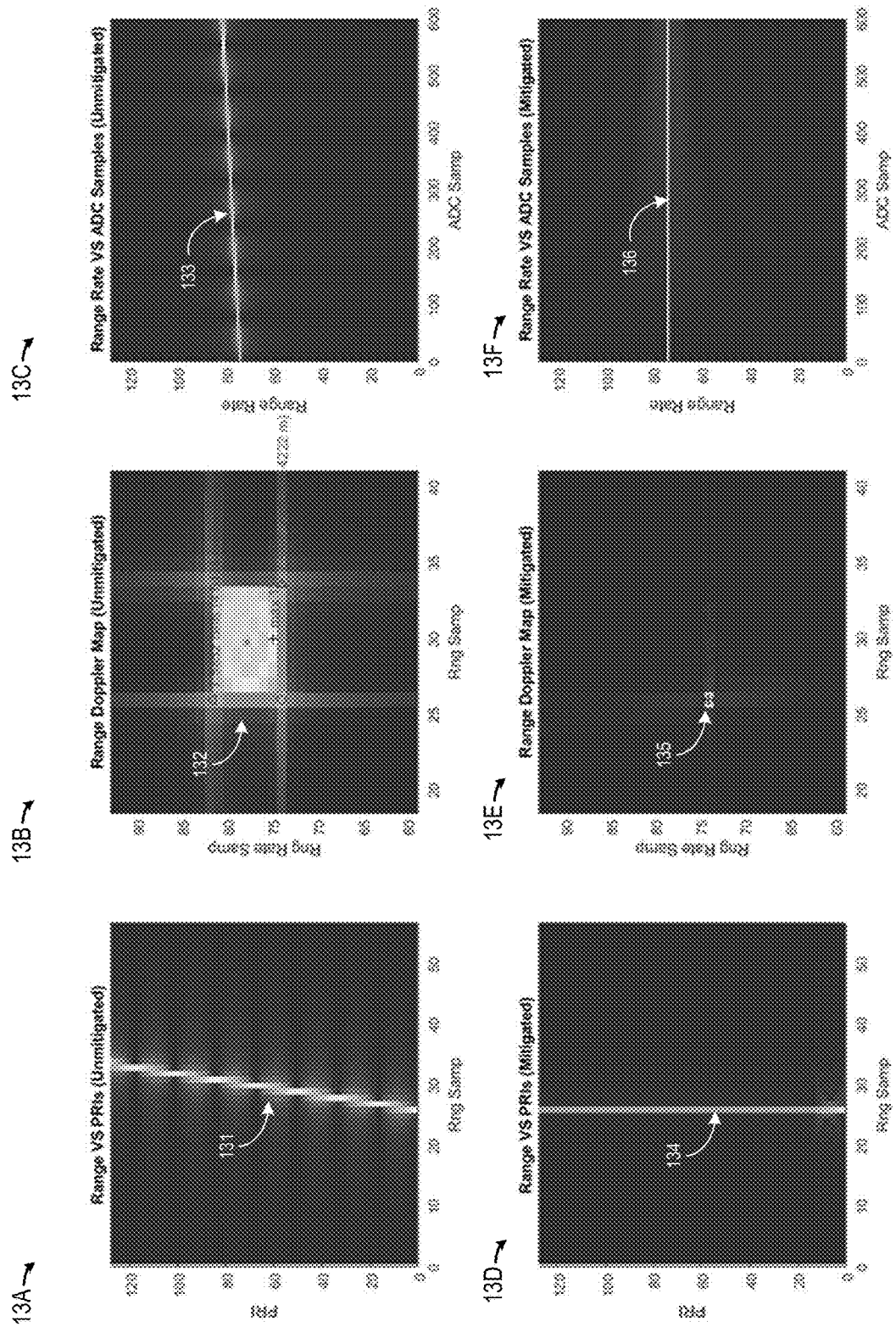
FIG. 13 shows simulated range migration effects of a single range migrating target with simulated range-chirp maps, range-doppler maps, and ADC sample-Doppler maps before and after migration.

In order to validate the effectiveness of the range migration DSP processes disclosed herein, reference is now made to FIG. 13 shows simulated range migration effects of a single constant-radial velocity range migrating target, including a simulated range-chirp map 13A, range-doppler map 13B, and ADC sample-Doppler map 13C before migration, along with a simulated range-chirp map 13D, range-doppler map 13E, and ADC sample-Doppler map 13F after migration. Starting with FIGS. 13A-C, there are depicted simulations for a constant-radial velocity target resulting in significant range migration. In particular, FIG. 13A depict the range spectrum output (horizontal slices) as function of chirps or PRIs (vertical axis). The bright colors indicate strong amplitudes, and the slanted profile line 131 shows that the range is migrating from the $26^{th}$ to the $34^{th}$ range cell across the 128 chirps. The range migration effect can also be observed in the simulated ADC sample-Doppler map 13C where the slanted line 133 which shows that the range rate varies from the $74^{th}$ range rate cell to the $82^{nd}$ range rate cell across the 600 ADC samples. Due to the range migration, the resulting range-Doppler response is smeared as expected (with reduced SNR and widened peak) as depicted in FIG. 13B with the smeared region 132.

The result of the mitigation is depicted in the simulations shown in FIGS. 13D-F. In particular, FIG. 13F depicts the effectiveness of the first step of using a modified DFT filter to compute the Doppler spectrum where the horizontal profile line 136 shows that the migration of the range rate is removed. In addition, FIG. 13E illustrates that, in the next step of computing the range spectrum, the target 135 is refocused on the range-Doppler map. While the range-chirp map of FIG. 13D is not required of the proposed process, it is produced here from the focused range-Doppler map 13E as a reference to demonstrate that the range migration effect is also removed, resulting in a vertical line 134 having a constant range value aligned to the start of the chirp sequence, which is at the $26^{th}$ range cell.

Figure 14:
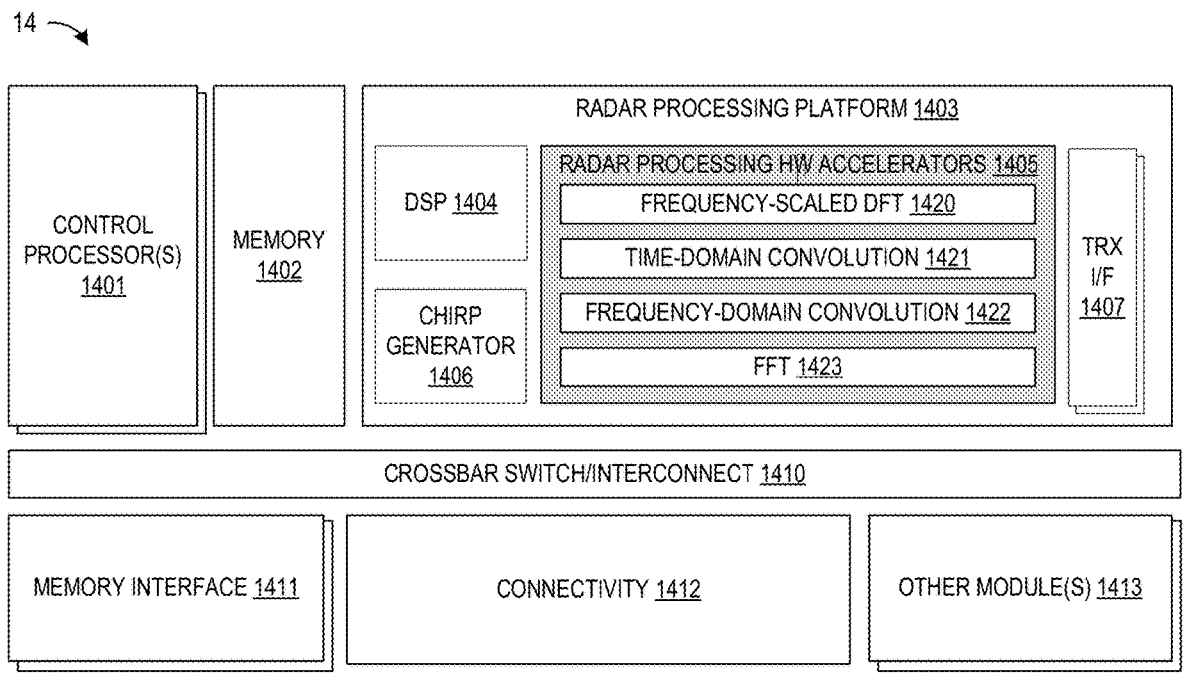
FIG. 14 is a simplified architectural block diagram of a microcontroller system for automotive and industrial high-performance radar applications in accordance with selected embodiments of the present disclosure.

To provide additional details for an improved understanding of selected embodiments of the present disclosure, reference is now made to FIG. 14 which illustrates a simplified architectural block diagram of a microcontroller system 14 for automotive and industrial high-performance radar applications which implements range migration mitigation using a modified Doppler filter tuned to scaled and fast time-dependent frequencies. As depicted, the microcontroller system 14 includes one or more control processor or central processing unit (CPU) subsystems 1401, on-chip memory 1402 (e.g., volatile or non-volatile memory), and radar processing platform 1403 for providing radar-specific high throughput signal processing. For example, the radar processing platform 1403 may include one or more digital signal processor (DSP) cores 1404, one or more radar processing hardware accelerators 1405, a chirp generator 1406, and a transceiver interface 1407 to provide transmit and receive module control and processing. The processor(s) 1401, on-chip memory 1402, and radar processing platform 1403 may be connected over an on-chip interconnect 1410 to a memory interface 1411, (e.g., DDR interface), one or more connectivity modules 1412 (e.g., PCIe 2x, FlexPWM, eTimer, IIC, DSPI, etc.), and other modules 1413. In selected embodiments, the microcontroller system 14 may be implemented as circuitry on a single integrated circuit or system-on-chip (SoC). In addition, the interconnect 1410 can be any type of bus structure, including but not limited to a non-coherent interconnect, an advanced high-performance bus (AHB), or an advanced peripheral bus (APB). In addition, the control processor(s) 1401 may be any type of processing circuit, including but not limited to a microprocessor (MPU), microcontroller (MCU), digital signal processor (DSP), or another type of processor or processor core with multiple levels of cache memory. Though not shown, the microcontroller system 14 may include peripheral devices or special-purpose processors, communication interfaces, timers, encoders/decoders, and one or more external memory interfaces, such as DDR interface or flash interface. In turn, the external memory interfaces may be connected to external memory, such as DDR memory or flash memory.

As disclosed, the microcontroller system 14 may use the control processor(s) 1401 to provide a signal processing toolbox (SPT) which receives digital output signals from the radar processing platform 1403 which uses the modules 1404-1007 to process received radar return signals by applying signal conditioning (e.g., low noise amplification, low/high pass filtering, and analog-to-digital conversion) and signal analysis (e.g., gain, windowing, FFT, and filtering). The resulting digital output signals are then processed by the control processor(s) 1401 for detection and tracking to detect one or more targets. In particular, the control processor(s) 1401 may execute control code instructions and/or hardware for performing a frequency-scaled DFT 1420 on digital samples of the received and de-ramp-mixed chirp signals to extract focused ADC-Doppler cute information. Alternatively, the control processor(s) 1401 may execute control code instructions and/or hardware for performing a time-domain convolution 1421 on digital samples of the received and de-ramp-mixed chirp signals to extract focused ADC-Doppler cute information. Alternatively, the control processor(s) 1401 may execute control code instructions and/or hardware for performing a frequency-domain convolution 1422 on digital samples of the received and de-ramp-mixed chirp signals to extract focused ADC-Doppler cute information. In addition, the control processor(s) 1401 may execute control code instructions and/or hardware for performing a short-time FFT or long-time FFT 1423 on the focused ADC-Doppler cute information to extract KST range-Doppler cube information.

Figure 15:
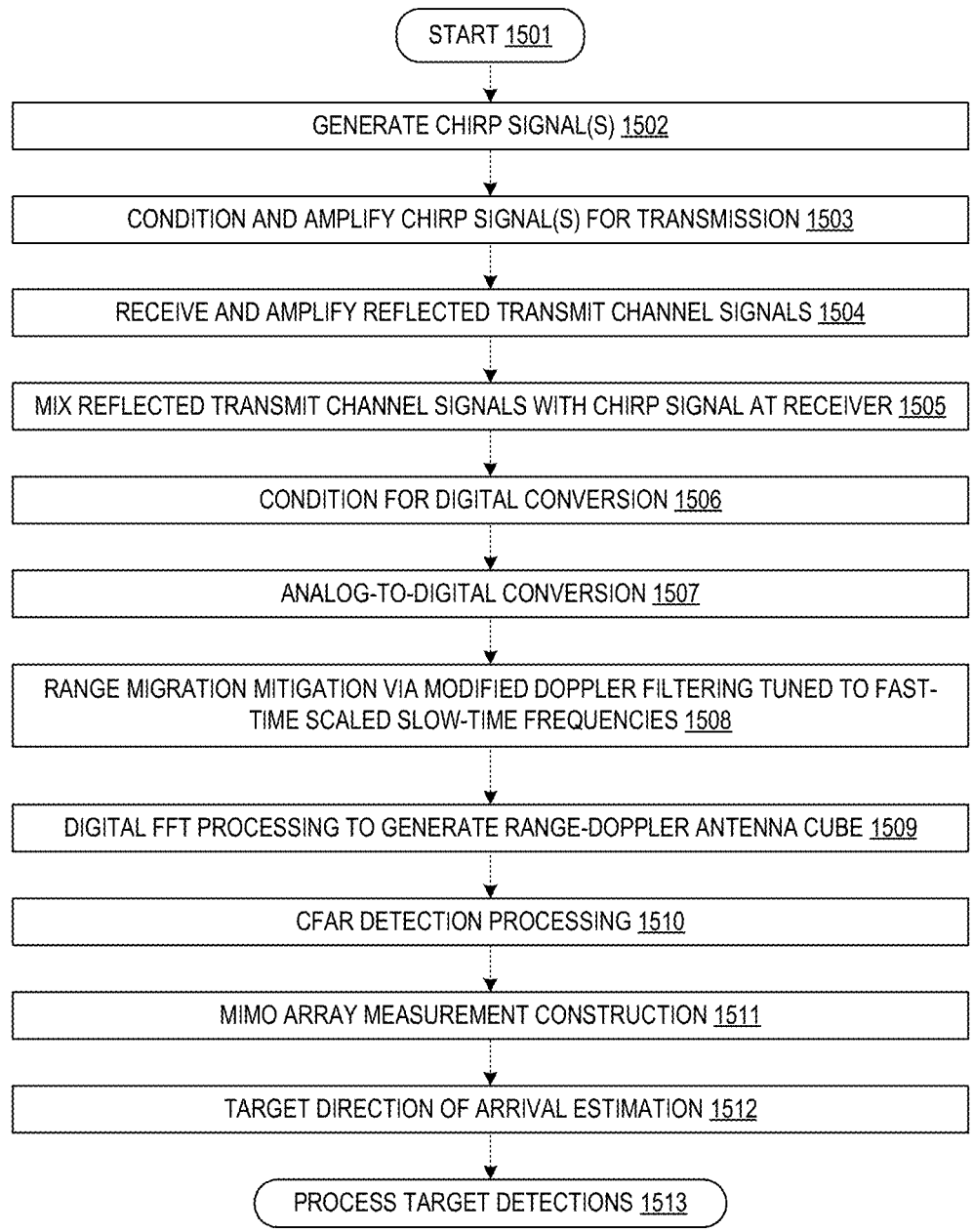
FIG. 15 illustrates a simplified flow chart showing the logic for implementing a transformation and resampling process with Keystone transformation using Doppler filtering tuned to scaled and fast time-dependent frequencies to implement range migration mitigation in accordance with selected embodiments of the present disclosure.

To provide additional details for an improved understanding of selected embodiments of the present disclosure, reference is now made to FIG. 15 which illustrates a simplified flow chart 15 showing the logic for implementing range migration mitigation with a Keystone transformation process using Doppler filtering tuned to scaled and fast time-dependent frequencies. In an example embodiment, the control logic and methodology shown in FIG. 15 may be implemented with a combination of hardware and software on a radar controller processor which directly filters ADC samples using a modified DFT Doppler filter that is tuned to fast-time scaled, slow-time frequencies. In selected embodiments, a modified DFT Doppler process can be streamlined by arranging the modified DFT into a discrete convolution form that may be implemented in the frequency domain by using a hardware-accelerated Fast Fourier Transform (FFT) and Inverse Fast Fourier Transform (IFFT) engine, thereby achieving improved computational efficiency and speed.

The process starts (step 1501), such as when the radar system begins the process of sensing the location and movement of one or more target objects using transmit radar signals that are sent over a plurality of transmit antennas. To generate the transmit radar signals, the radar system first generates a reference chirp signal (step 1502), such as by periodically modulating a transmit radar signal with a frequency and/or phase shift. For example, with automotive Frequency Modulation Continuous Wave (FMCW) radars, the reference chirp signal may be generated as a Linear Frequency Modulation (LFM) waveform that is distributed to a plurality of transmit channel circuits which are respectively associated with a plurality of transmit antennas.

At step 1503, the chirp signals are conditioned and amplified for transmission over the corresponding transmit channel circuits. In selected embodiments, this processing is performed by the transmit channel circuits which each include an RF conditioning module (which filters the chirp signal) and power amplifier (which amplifies the RF conditioning module output for transmission over a corresponding transmit antenna). In embodiments where time-domain modulation is used in combination with the frequency/phase offset modulation, the non-adjacent transmit channel circuits may be controlled to sequentially condition and amplify transmit radar waveforms from non-adjacent transmit antennas. For example, the radar transmit channel circuits may transmit LFM pulses from one or more transmit antennas.

At step 1504, each receiver channel may receive and amplify the target-reflected reference chirp signals at one or more receive antennas. In selected embodiments, one or more receive antennas at the receiver module receive target returns from the transmitted reference chirp signal waveforms as (radio frequency) antenna signals for subsequent amplification, such as by using a low noise amplifier to generate an amplified RF signal from the target returns.

At step 1505, each receiver channel may mix the amplified transmit channel signals with the reference chirp signal at the receiver to generate an intermediate frequency (IF) signal. In selected embodiments, the mixing step may be implemented by applying the reference chirp signal to a receiver module mixer (or deramp mixer) which is also connected to receive the amplified transmit channel signals for mixing with the reference chirp signal, thereby generating an intermediate frequency signal.

At step 1506, each receiver channel may condition the intermediate frequency signal for digital conversion. In selected embodiments, the conditioning process includes at least feeding the intermediate frequency signal to a bandpass-pass filter, alone or in combination with additional programmable gain and/or filtering steps, thereby generating a bandpass-filtered signal.

At step 1507, each receiver channel may digitize the bandpass-filtered conditioned IF signal, such as by using a high-speed analog/digital converter (ADC) to generate ADC samples for output as a digital signal output that is suitable for digital processing. In automotive radar applications which use a deramp mixer to mix the received signal with transmitted signal before analog-to-digital conversion, there is no down-conversion and Nyquist sampling of the received signal which would require very high ADC sampling rates (e.g., GHz sampling rates), so a lower ADC sampling rate can be used (e.g., tens of MHz).

At step 1508, the radar controller performs range migration mitigation processing on the digital signal using a modified Doppler filter that is tuned to fast-time scaled slow-time frequencies, thereby generating a Doppler compressed signal. As a preliminary step range migration mitigation processing, the radar controller may be configured to construct an ADC sample-chirp-antenna cube (raw data cube) for each frame by storing store the ADC samples sample-by-sample over fast time and chirp-by-chirp over slow-time for each Rx antenna. In addition, the radar controller may be configured to process each raw data cube by performing modified Doppler filtering, for each ADC sample position, down the slow-time dimension, using a plurality of modified DFT Doppler filters which are each tuned to a slow-time frequency as a function of a desired target detection radial velocity and a scaling factor which is a function of the current fast-time ADC sample's sampling time relative to the chirp acquisition start time. As a result of performing modified Doppler filtering of each fast-time ADC sample position and all antennas in the raw data cube, the radar controller generates and outputs a range migration free ADC sample-Doppler-antenna cube.

At step 1509, the radar controller performs digital FFT processing on the ADC sample-Doppler-antenna cube to generate a range compressed signal. In selected embodiments, the radar controller is configured to process the ADC sample-Doppler-antenna cube by computing the range spectrum for each Doppler cell position, down the fast-time dimension compute the range spectrum using any spectral analysis method, such as FFT. As a result of performing FFT processing of each Doppler cell position and all antennas in the ADC sample-Doppler-antenna cube, the radar controller generates and outputs a range migration free range-Doppler-antenna cube.

Subsequently, the radar controller processes each range migration free range-Doppler-antenna cube to extract high-quality range and angular information on one or more targets, such as by performing CFAR detection processing (step 1510), MIMO virtual array construction (step 1511), and target direction of arrival estimation (step 1512) to obtain the final target information, including range, Doppler (radial velocity), angle(s), and amplitude, etc. The target information may then be output to subsequent perception processing such as clustering, centroiding, tracking, perception-level target detection, target classification, and sensor fusion. The output of the perception is fed to other automotive systems such as ADAS, autonomous diving path planning and drive control, and user displays and data logging.

As disclosed herein, an LFM radar system is provided which implements a highly efficient Keystone Transform for mitigating range migration by operating directly on ADC samples with a modified DFT Doppler filter. By using FFT and IFFT hardware accelerators to operate directly on the fast-time ADC samples out of the deramp mixer in the time domain, KST processing can be performed in the time or frequency domain without explicit interpolation. In addition, the streamlined KST processing disclosed herein does not require very high ADC sampling rates, nor is there a requirement to first perform matched filtering processing upon samples to obtain fast-time range response before performing KST processing.

By now it should be appreciated that there has been provided a linear chirp radar system, device, and method of operation. The disclosed radar system includes a radio-frequency (RF) transmitter unit and first plurality of transmit antennas which are connected to transmit linear chirp radar signals in a sequence of transmit frames. The disclosed radar system also includes an RF receiver unit and a first plurality of receive antennas which are connected to generate analog-to-digital (ADC) sample signals from one or more target return signals received in response to the linear chirp radar signals. In addition, the disclosed radar system includes a radar control processing unit connected and configured to control the RF transmitter unit and the RF receiver unit. As disclosed, the radar control processing unit is configured to mitigate range migration by directly filtering the ADC samples using a modified Doppler filter that is tuned to fast-time scaled, slow-time frequencies to generate a focused ADC Doppler cube, and by applying a Fourier Transform on each Doppler cell in the focused ADC Doppler cube to generate a focused range-Doppler cube. In selected embodiments, the radar control processing unit may be configured to apply the Fourier Transform by performing Doppler fast Fourier transform (FFT) on ADC samples in the focused ADC Doppler cube to generate a range spectrum from each Doppler bin sample in the focused ADC Doppler cube. In other embodiments, the radar control processing unit is configured to generate, from the ADC sample signals, an ADC sample-chirp antenna cube for each transmit frame. In such embodiments, the radar control processing unit may be configured to directly filter the ADC samples by computing range migration mitigated Doppler spectrums for each ADC sample in the ADC sample-chirp antenna cube, recursively chirp-by-chirp until a last chirp is processed. In selected embodiments, the radar control processing unit is configured to directly filter the ADC samples by applying a frequency-scaled discrete Fourier Transform (DFT) Doppler filter which computes a time-domain convolution from the ADC samples. In other embodiments, the radar control processing unit is configured to directly filter the ADC samples by applying a frequency-scaled discrete Fourier Transform (DFT) Doppler filter which computes a frequency-domain convolution from the ADC samples. In either case, the radar control processing unit may be configured to compute the time-domain convolution or the frequency-domain convolution from the ADC samples using a Fast Fourier Transform hardware accelerator and an Inverse Fast Fourier Transform hardware accelerator.

In another form, there is provided a method for operating a radar system and device. In the disclosed methodology, linear chirp radar signals are transmitted in a sequence of transmit frames from a first plurality of transmit antennas. In addition, the disclosed methodology generates analog-to-digital (ADC) sample signals from one or more target return signals received at a first plurality of receive antennas in response to the linear chirp radar signals. The disclosed methodology also processes the ADC sample signals at a radar control processing unit that is connected and configured to mitigate range migration in the ADC sample signals by directly filtering the ADC samples using a modified Doppler filter that is tuned to fast-time scaled, slow-time frequencies to generate a focused ADC Doppler cube, and by applying a Fourier Transform on each Doppler cell in the focused ADC Doppler cube to generate a focused range-Doppler cube. In selected embodiments, the ADC sample signals are processed by generating, from the ADC sample signals, an ADC sample-chirp antenna cube for each transmit frame. In such embodiments, the ADC samples are directly filtered by computing range migration mitigated Doppler spectrums for each ADC sample in the ADC sample-chirp antenna cube, recursively chirp-by-chirp until a last chirp is processed. In other embodiments, the Fourier Transform is applied on each Doppler cell by performing Doppler fast Fourier transform (FFT) on ADC samples in the focused ADC Doppler cube to generate a range spectrum from each Doppler bin sample in the focused ADC Doppler cube. In selected embodiments, the ADC samples are directly filtered by applying a frequency-scaled discrete Fourier Transform (DFT) Doppler filter which computes a time-domain convolution from the ADC samples. In such embodiments, the frequency-scaled discrete DFT Doppler filter is applied by computing the time-domain convolution from the ADC samples using a Fast Fourier Transform hardware accelerator and an Inverse Fast Fourier Transform hardware accelerator. In selected embodiments, the ADC samples are directly filtered by applying a frequency-scaled discrete Fourier Transform (DFT) Doppler filter which computes a frequency-domain convolution from the ADC samples. In such embodiments, the frequency-scaled discrete DFT Doppler filter is applied by computing the frequency-domain convolution from the ADC samples using a Fast Fourier Transform hardware accelerator and an Inverse Fast Fourier Transform hardware accelerator.

In yet another form, there is provided a radar apparatus and associated method of operation. In the disclosed radar apparatus, a plurality of transmitter modules is configured to transmit a plurality of linear chirp waveforms in a sequence of transmit frames. The radar apparatus also includes at least a first receiver module connected and configured to receive one or more target return signals reflected from the plurality of linear chirp waveforms by at least one target and to generate analog-to-digital (ADC) sample signals from one or more target return signals. In addition, the radar apparatus includes a radar control processing unit connected and configured to control the plurality of transmitter modules and at least the first receiver module to mitigate range migration by directly filtering the ADC samples using a modified Doppler filter that is tuned to fast-time scaled, slow-time frequencies to generate a focused ADC Doppler cube, and by applying a Fourier Transform on each Doppler cell in the focused ADC Doppler cube to generate a focused range-Doppler cube. In selected embodiments, the radar control processing unit is configured to apply the Fourier Transform by performing Doppler fast Fourier transform (FFT) on ADC samples in the focused ADC Doppler cube to generate a range spectrum from each Doppler bin sample in the focused ADC Doppler cube. In other embodiments, the radar control processing unit is configured to directly filter the ADC samples by applying a frequency-scaled discrete Fourier Transform (DFT) Doppler filter which computes a time-domain convolution from the ADC samples using a Fast Fourier Transform hardware accelerator and an Inverse Fast Fourier Transform hardware accelerator. In other embodiments, the radar control processing unit is configured to directly filter the ADC samples by applying a frequency-scaled discrete Fourier Transform (DFT) Doppler filter which computes a frequency-domain convolution from the ADC samples using a Fast Fourier Transform hardware accelerator and an Inverse Fast Fourier Transform hardware accelerator.

Although the described exemplary embodiments disclosed herein focus on example automotive radar circuits, systems, and methods for using same, the present invention is not necessarily limited to the example embodiments illustrate herein. For example, various embodiments of the range migration mitigation processing may be applied in non-automotive applications, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. In addition, it will be appreciated that references to a functional "unit" or "module" or "block" may be implemented in whole or in part with hardware circuits or circuitry, alone or in combination with processor-implemented control logic in one or more integrated circuits (chips). As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radar system, comprising:
  a radio-frequency (RF) transmitter unit and first plurality of transmit antennas which are connected to transmit linear chirp radar signals in a sequence of transmit frames;
  a RF receiver unit and a first plurality of receive antennas which are connected to generate analog-to-digital (ADC) sample signals from one or more target return signals received in response to the linear chirp radar signals; and
  a radar control processing unit connected and configured to control the RF transmitter unit and the RF receiver unit to mitigate range migration by directly filtering the ADC samples using a modified Doppler filter that is tuned to fast-time scaled, slow-time frequencies to generate a focused ADC Doppler cube, and by applying a Fourier Transform on each Doppler cell in the focused ADC Doppler cube to generate a focused range-Doppler cube.

2. The radar system of claim 1, wherein the radar control processing unit is configured to generate, from the ADC sample signals, an ADC sample-chirp antenna cube for each transmit frame.

3. The radar system of claim 2, wherein the radar control processing unit is configured to directly filter the ADC samples by computing range migration mitigated Doppler spectrums for each ADC sample in the ADC sample-chirp antenna cube, recursively chirp-by-chirp until a last chirp is processed.

4. The radar system of claim 1, wherein the radar control processing unit is configured to apply the Fourier Transform by performing Doppler fast Fourier transform (FFT) on ADC samples in the focused ADC Doppler cube to generate a range spectrum from each Doppler bin sample in the focused ADC Doppler cube.

5. The radar system of claim 1, wherein the radar control processing unit is configured to directly filter the ADC samples by applying a frequency-scaled discrete Fourier Transform (DFT) Doppler filter which computes a time-domain convolution from the ADC samples.

6. The radar system of claim 5, wherein the radar control processing unit is configured to compute the time-domain convolution from the ADC samples using a Fast Fourier Transform hardware accelerator and an Inverse Fast Fourier Transform hardware accelerator.

7. The radar system of claim 1, wherein the radar control processing unit is configured to directly filter the ADC samples by applying a frequency-scaled discrete Fourier Transform (DFT) Doppler filter which computes a frequency-domain convolution from the ADC samples.

8. The radar system of claim 7, wherein the radar control processing unit is configured to compute the frequency-domain convolution from the ADC samples using a Fast Fourier Transform hardware accelerator and an Inverse Fast Fourier Transform hardware accelerator.

9. A method for operating a radar system, comprising:
transmitting linear chirp radar signals in a sequence of transmit frames from a first plurality of transmit antennas;
generating analog-to-digital (ADC) sample signals from one or more target return signals received at a first plurality of receive antennas in response to the linear chirp radar signals; and
processing the ADC sample signals at a radar control processing unit connected and configured to mitigate range migration in the ADC sample signals by directly filtering the ADC samples using a modified Doppler filter that is tuned to fast-time scaled, slow-time frequencies to generate a focused ADC Doppler cube, and by applying a Fourier Transform on each Doppler cell in the focused ADC Doppler cube to generate a focused range-Doppler cube.

10. The method of claim 9, wherein processing the ADC sample signals comprises generating, from the ADC sample signals, an ADC sample-chirp antenna cube for each transmit frame.

11. The method of claim 10, wherein directly filtering the ADC samples comprises computing range migration mitigated Doppler spectrums for each ADC sample in the ADC sample-chirp antenna cube, recursively chirp-by-chirp until a last chirp is processed.

12. The method of claim 9, wherein directly filtering the ADC samples comprises applying a frequency-scaled discrete Fourier Transform (DFT) Doppler filter which computes a time-domain convolution from the ADC samples.

13. The method of claim 12, wherein applying the frequency-scaled discrete DFT Doppler filter comprises computing the time-domain convolution from the ADC samples using a Fast Fourier Transform hardware accelerator and an Inverse Fast Fourier Transform hardware accelerator.

14. The method of claim 9, wherein directly filtering the ADC samples comprises applying a frequency-scaled discrete Fourier Transform (DFT) Doppler filter which computes a frequency-domain convolution from the ADC samples.

15. The method of claim 14, applying the frequency-scaled discrete DFT Doppler filter comprises computing the frequency-domain convolution from the ADC samples using a Fast Fourier Transform hardware accelerator and an Inverse Fast Fourier Transform hardware accelerator.

16. A radar apparatus comprising:
a plurality of transmitter modules configured to transmit a plurality of linear chirp waveforms in a sequence of transmit frames;
at least a first receiver module connected and configured to receive one or more target return signals reflected from the plurality of linear chirp waveforms by at least one target and to generate analog-to-digital (ADC) sample signals from one or more target return signals; and
a radar control processing unit connected and configured to control the plurality of transmitter modules and at least the first receiver module to mitigate range migration by directly filtering the ADC samples using a modified Doppler filter that is tuned to fast-time scaled, slow-time frequencies to generate a focused ADC Doppler cube, and by applying a Fourier Transform on each Doppler cell in the focused ADC Doppler cube to generate a focused range-Doppler cube.

17. The radar apparatus of claim 16, wherein the radar control processing unit is configured to apply the Fourier Transform by performing Doppler fast Fourier transform (FFT) on ADC samples in the focused ADC Doppler cube to generate a range spectrum from each Doppler bin sample in the focused ADC Doppler cube.

18. The radar apparatus of claim 16, wherein the radar control processing unit is configured to directly filter the ADC samples by applying a frequency-scaled discrete Fourier Transform (DFT) Doppler filter which computes a time-domain convolution from the ADC samples using a Fast Fourier Transform hardware accelerator and an Inverse Fast Fourier Transform hardware accelerator.

19. The radar apparatus of claim 16, wherein the radar control processing unit is configured to directly filter the ADC samples by applying a frequency-scaled discrete Fourier Transform (DFT) Doppler filter which computes a frequency-domain convolution from the ADC samples using a Fast Fourier Transform hardware accelerator and an Inverse Fast Fourier Transform hardware accelerator.

20. The radar apparatus of claim 16, wherein the radar control processing unit is configured to directly filter the ADC samples by computing range migration mitigated Doppler spectrums for each ADC sample in the ADC sample-chirp antenna cube, recursively chirp-by-chirp until a last chirp is processed.

* * * * *